(12) United States Patent
Matsutani

(10) Patent No.: US 7,706,672 B2
(45) Date of Patent: Apr. 27, 2010

(54) IMAGING APPARATUS AND IMAGING METHOD

(75) Inventor: Atsushi Matsutani, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 158 days.

(21) Appl. No.: 11/971,044

(22) Filed: Jan. 8, 2008

(65) Prior Publication Data

US 2008/0181593 A1 Jul. 31, 2008

(30) Foreign Application Priority Data

Jan. 29, 2007 (JP) .............................. 2007-017616

(51) Int. Cl.
G03B 17/00 (2006.01)

(52) U.S. Cl. ...................................... 396/55

(58) Field of Classification Search .................. 396/55; 348/208.99, 208.2, 208.4, 208.5, 208.7; 359/554, 359/555, 557

See application file for complete search history.

(56) References Cited

U.S. PATENT DOCUMENTS

| 5,633,756 | A | * | 5/1997 | Kaneda et al. | ............... 359/554 |
| 2005/0068425 | A1 | | 3/2005 | Matsutani | |
| 2006/0002751 | A1 | | 1/2006 | Matsutani | |

FOREIGN PATENT DOCUMENTS

| EP | 1 750 435 | A2 | 2/2007 |
| EP | 1 892 951 | A1 | 2/2008 |
| JP | 2613581 | | 2/1997 |
| JP | 2001-66655 | | 3/2001 |
| JP | 2005-72989 | | 3/2005 |
| JP | 2006-15604 | | 1/2006 |
| JP | 2006-245642 | | 9/2006 |
| JP | 2006-285073 | | 10/2006 |
| JP | 2007-43584 | | 2/2007 |
| JP | 2007-094320 | | 4/2007 |
| JP | 2007-094321 | | 4/2007 |
| JP | 2008-40457 | | 2/2008 |
| JP | 2008-048322 | | 2/2008 |
| JP | 2008-51888 | | 3/2008 |
| JP | 2008-53769 | | 3/2008 |
| JP | 2008-151888 | A | 7/2008 |
| JP | 2008-187335 | A | 8/2008 |
| JP | 2009-33500 | A | 2/2009 |
| WO | WO 2008/007791 | A1 | 1/2008 |

* cited by examiner

*Primary Examiner*—W. B. Perkey
*Assistant Examiner*—Minh Q Phan
(74) *Attorney, Agent, or Firm*—Dickstein Shapiro LLP

(57) ABSTRACT

An imaging apparatus according to the present invention aims to make a transit of a blur correction section from/to an electronically retained state to/from a mechanically retained state without causing image shifts on a display section. For this purpose, the imaging apparatus includes an image sensor, an LCD monitor, a gyro-sensor, a CCD stage, an actuator, a mechanical retention mechanism, a blur correction function in which the CCD stage is mechanically retained at a predetermined position during non-performance of a blur correction and it is electronically retained in a drivable state at a predetermined position during the blur correction, and a controller changing a display control over the LCD monitor when the CCD stage is transited from/to an electronically retained state to/from a mechanically retained state.

14 Claims, 28 Drawing Sheets

LCD MONITOR 1'

SW3: WIDE ANGLE DIRECTION ZOOM SWITCH
SW4: TELEPHOTO DIRECTION ZOOM SWITCH
SW5: SELF TIMER SWITCH
SW6: MENU SWITCH
SW7: UPWARD MOVEMENT/STROBOSCOPIC SETTING SWITCH
SW8: RIGHTWARD MOVEMENT SWITCH
SW9: DISPLAY SWITCH
SW10: DOWNWARD MOVEMENT/MACRO SWITCH
SW11: LEFTWARD MOVEMENT/IMAGE CHECKUP SWITCH
SW12: OK SWITCH
SW13: POWER-ON SWITCH
SW14: BLUR CORRECTION SWITCH

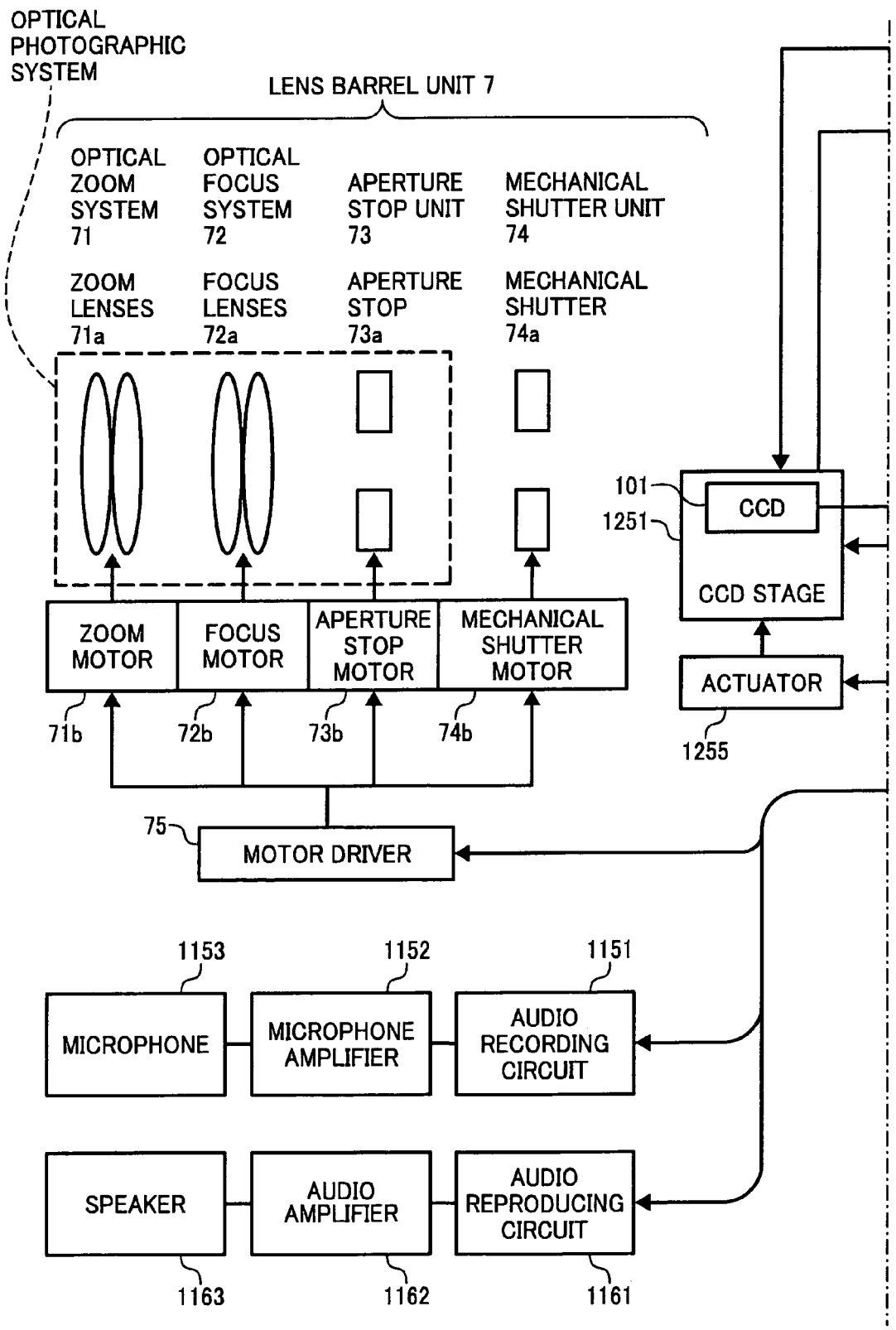

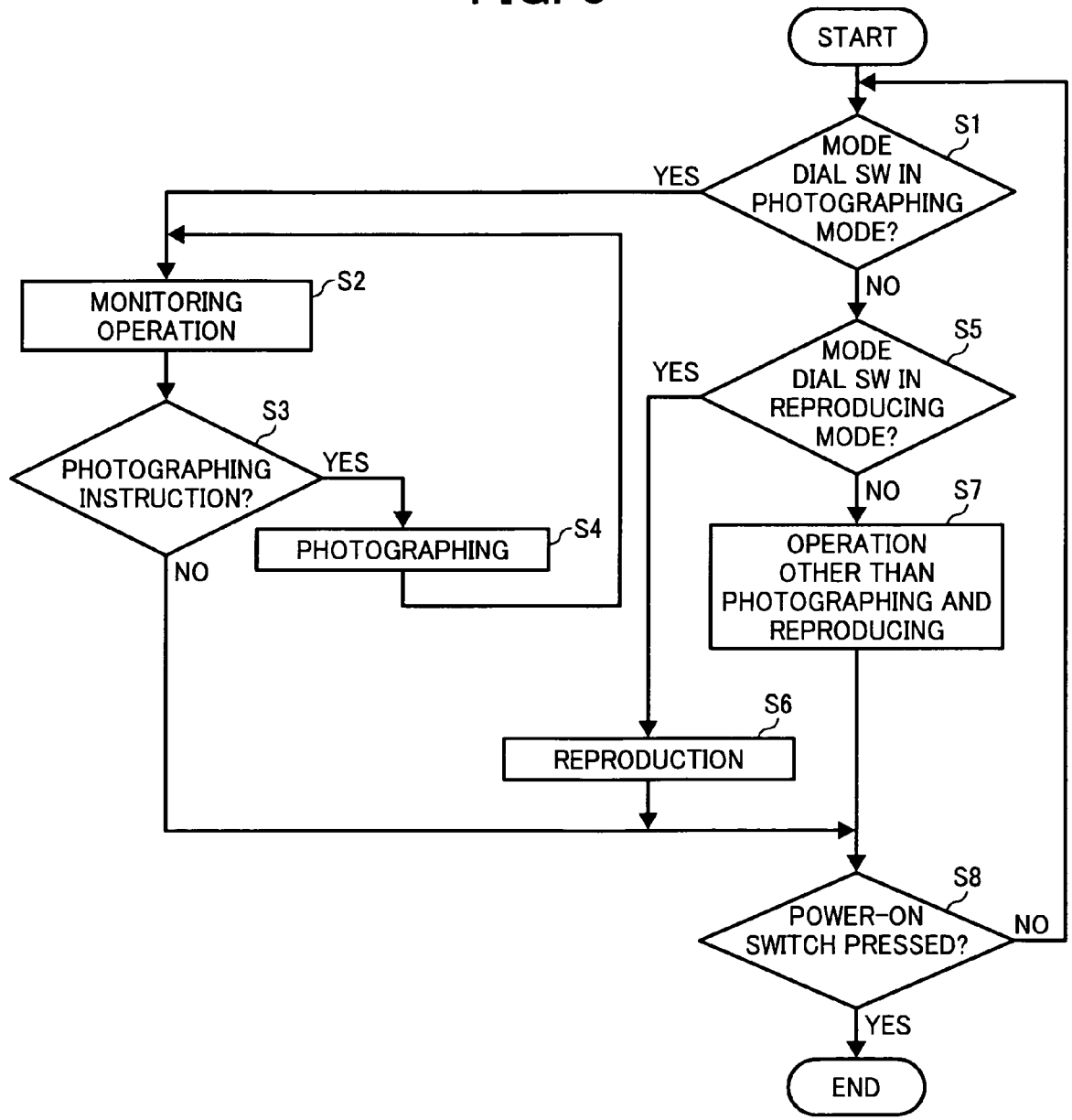

FIG. 6
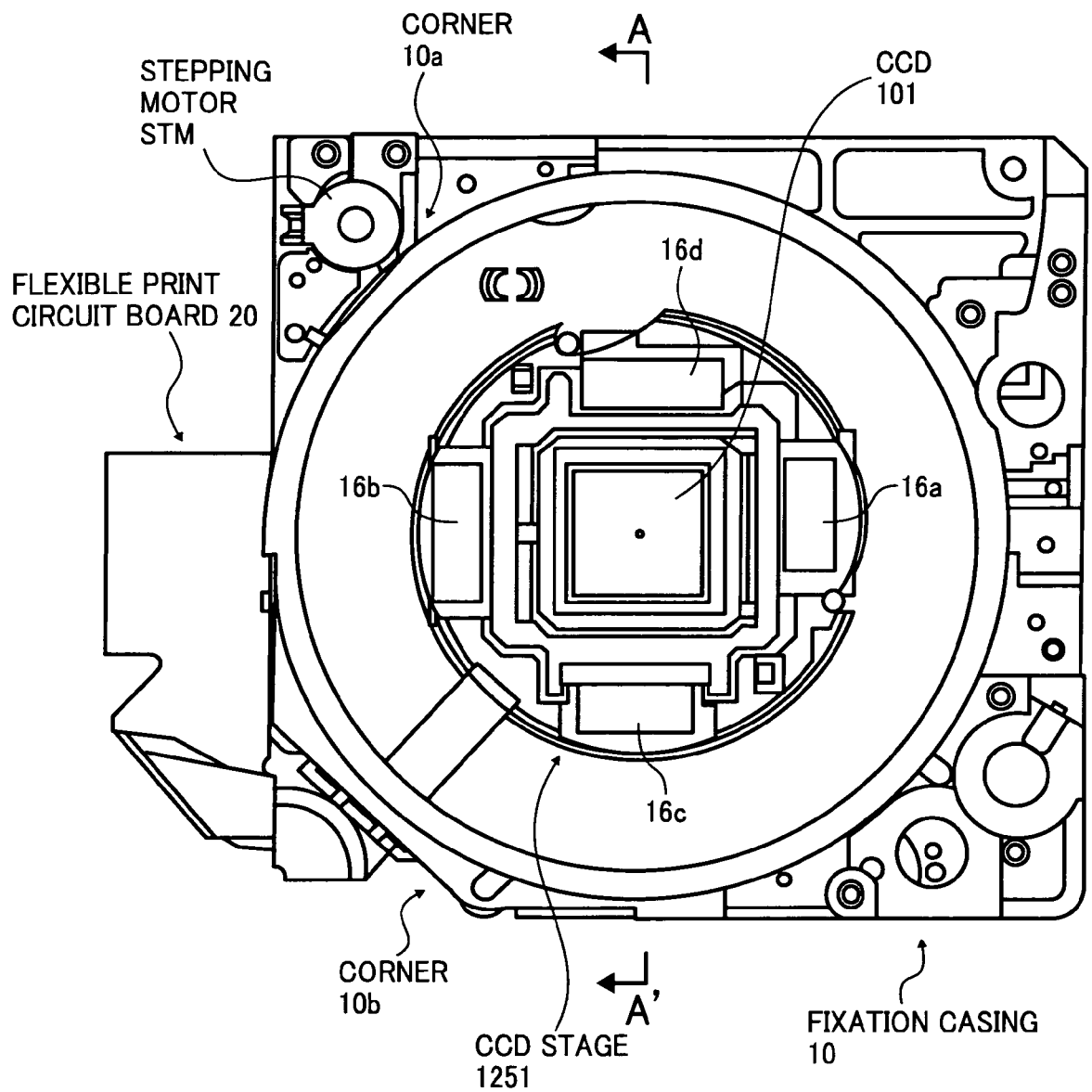
16a-16d: PERMANENT MAGNET
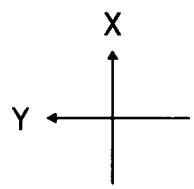

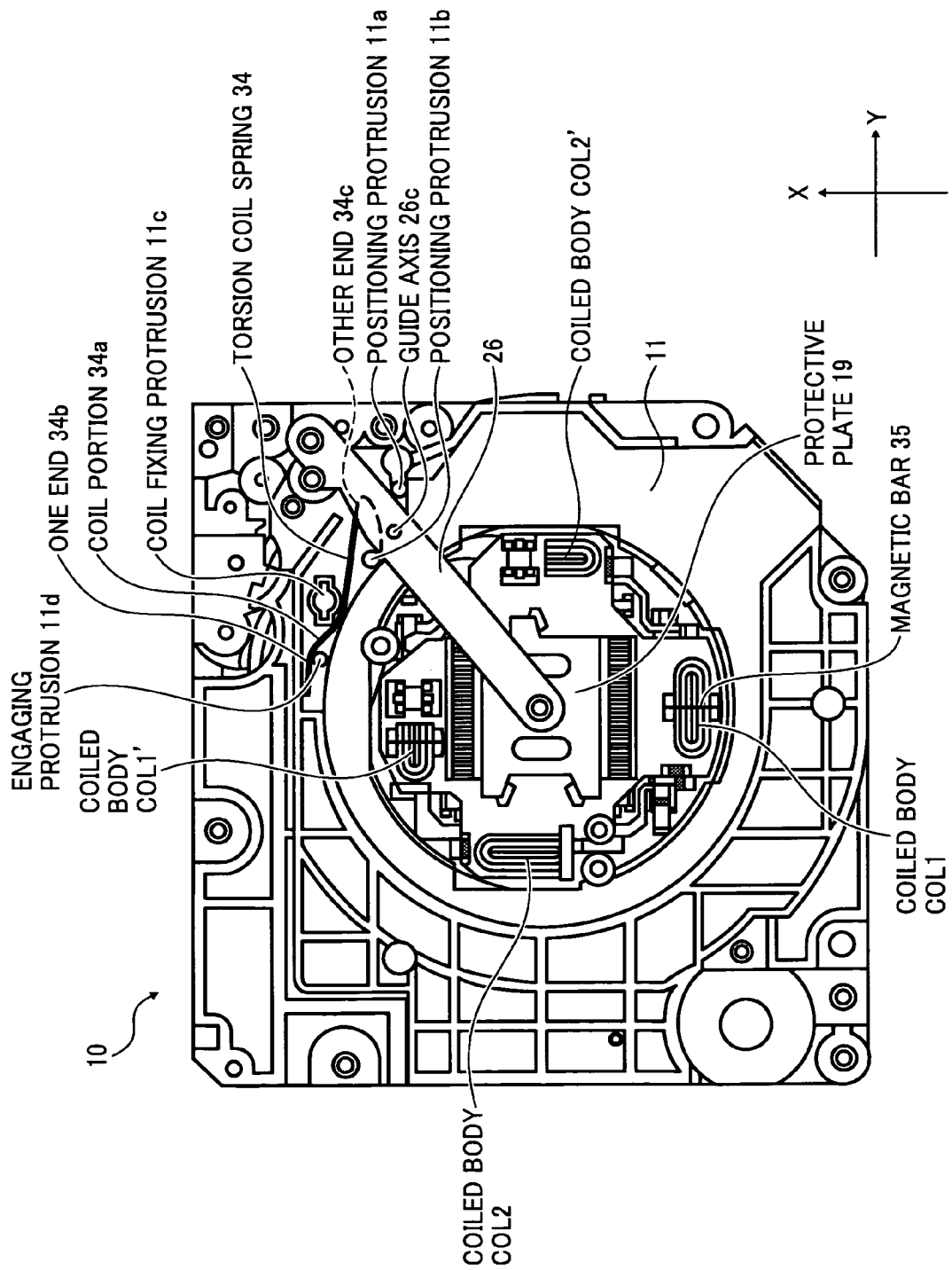

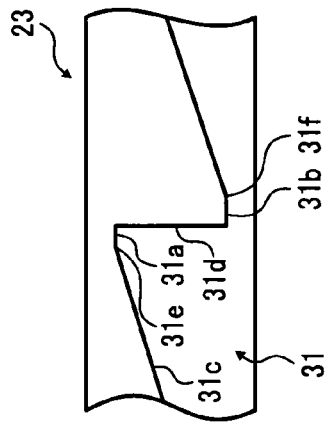
FIG. 12A
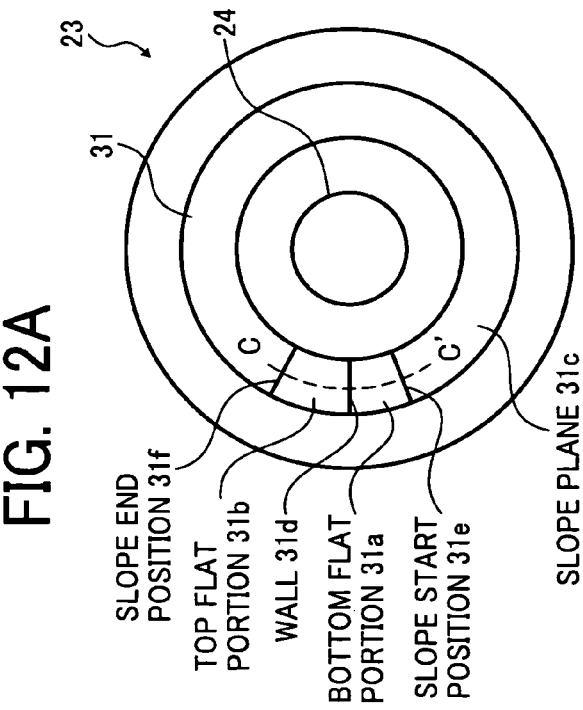
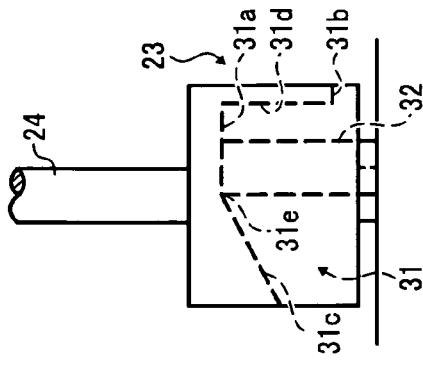
FIG. 12B
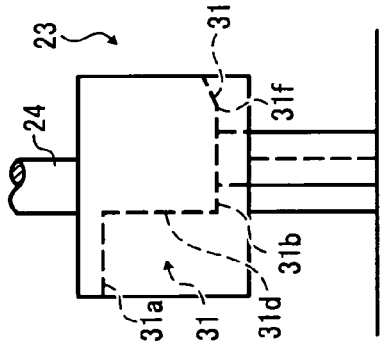
FIG. 12D
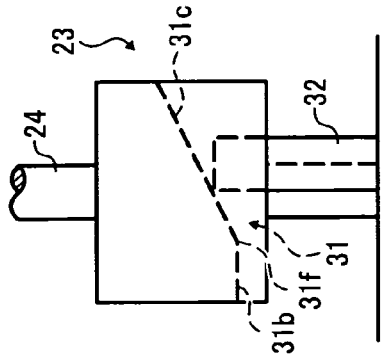
FIG. 12C
FIG. 12E CONTROL MADE WITH T [s] INTERVAL

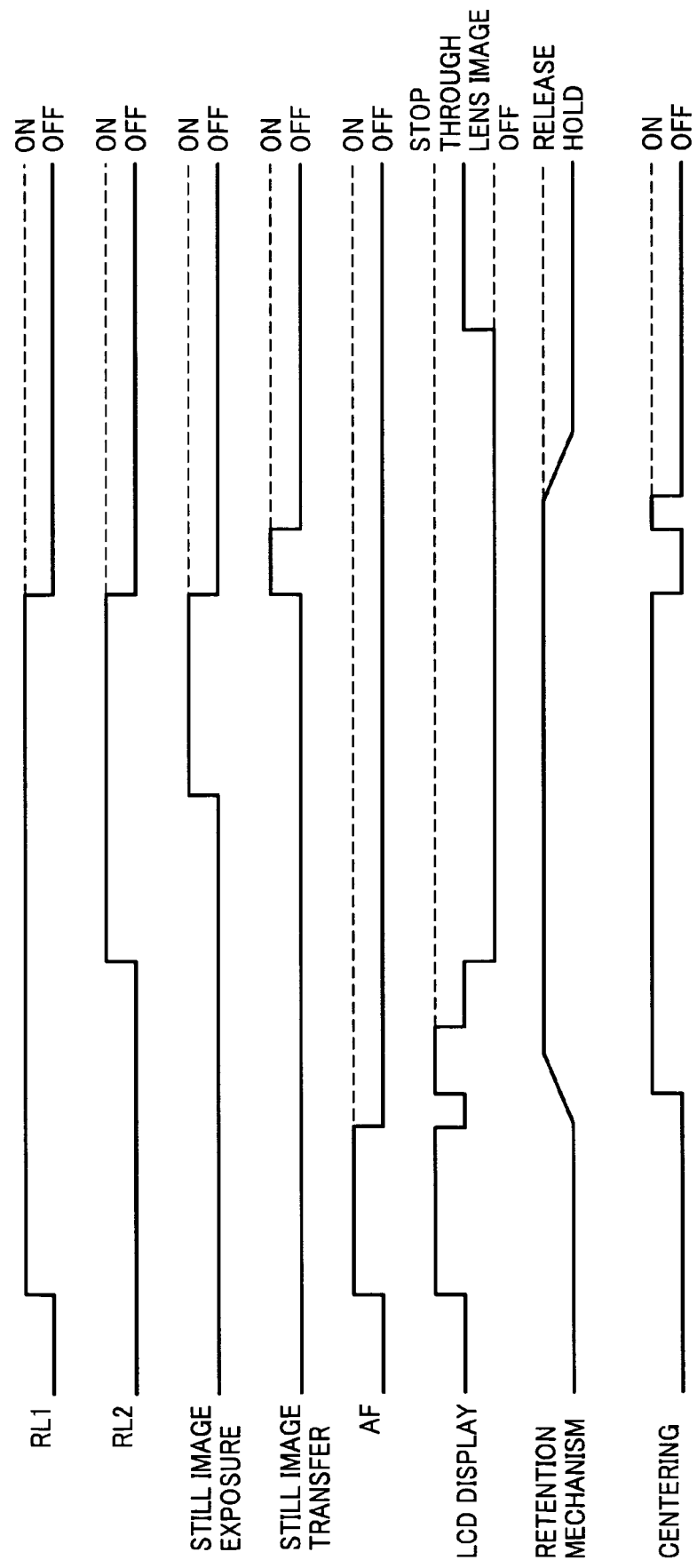

IMAGING APPARATUS AND IMAGING METHOD

CROSS REFERENCE TO RELATED APPLICATION

The present application is based on and claims priority from Japanese Patent Application No. 2007-17616, filed on Jan. 29, 2007, the disclosure of which is hereby incorporated by reference herein in its entirety.

BACKGROUND OF THE INVENTION

1. Field of the Invention

The present invention relates to an imaging apparatus having a blur correction function to correct blurs due to moving hands at shooting, as well as to an imaging method.

2. Description of the Related Art

In recent years, imaging apparatuses such as a still camera or a video camera with automatic multi-functions as auto-exposure or auto-focus mechanism have been very popular. Also, several techniques for blur correction to correct image blurs due to shakes or movements of the imaging apparatus have been realized.

In general, an anti-blur apparatus with such a blur correction function includes a shake detector which detects shakes of the apparatus, a blur corrector which corrects image blurs due to the shakes, a driver which drives the blur corrector, a controller which calculates a correction amount for the image blur in accordance with output of the shake detector to control the driver, and a retainer which mechanically retains the blur corrector at a predetermined position.

For example, Japanese Laid-Open Patent Application Publication No. 2001-66655 has disclosed a technique to correct blurs by detecting an amount of shakes of the imaging apparatus due to the moving hands of a user, detecting a shift of a substrate having a photoelectric converter while the substrate is being shifted according to the detected blur amount, and correcting the blur amount according to the detected shift to shift the substrate.

For another example, Japanese Patent No. 2613581 has disclosed an anti-blur apparatus having a portion to get in contact with a member moving for prevention of image blurs to allow it to be in a non-operational state. The anti-blur apparatus is configured so that the portion is smoothly transited from an operational state to the non-operational state, thereby preventing an occurrence of a mechanical failure and unnatural changes in an image during the transition as well as improving usability of the apparatus.

SUMMARY OF THE INVENTION

The present invention aims to solve the problems solved in the above documents by a different technique. The object of the present invention is to provide an imaging apparatus having a blur correction function in which a blur correction section is smoothly transited from a mechanically retained state to an electrically retained state without causing image shifts on a display or the like during the transition and to provide an imaging method therefor.

According to one aspect of the present invention, an imaging apparatus comprises an image sensor, a display section displaying an image from the image sensor, a shake detection section detecting a shake of the imaging apparatus, a blur correction section correcting a blur in an image due to the shake of the imaging apparatus, a driver section driving the blur correction section, a mechanical retention section mechanically retaining the blur correction section, an image blur correction function in which the blur correction section is mechanically retained at a predetermined position during non-performance of an image blur correction and the blur correction section is electronically retained in a drivable state at a predetermined position during the image blur correction, and a controller changing a display control over the display section when the blur correction section is transited from an electronically retained state to a mechanically retained state and/or from a mechanically retained state to electronically retained state.

According to another aspect of the present invention, in the imaging apparatus, the display control is changed such that an image update operation to the display section is temporarily stopped. Specifically, the image update operation to the display section is stopped at a timing when a predetermined length of time has elapsed from a stop of a control over the blur correction section in one of the electronically retained state and the mechanically retained state. The image update operation to the display section is resumed after the stoppage at a timing when a predetermined length of time has elapsed from a stop of a control over the blur correction section in one of the electronically retained state and the mechanically retained state.

According to still another aspect of the present invention, in the imaging apparatus, the display control is changed such that an On Screen Display is temporarily displayed on the display section. Specifically, the temporary display of the On Screen Display is stopped at a timing when a predetermined length of time has elapsed from a stop of a control over the blur correction section in one of the electronically retained state and the mechanically retained state. The temporary display of the On Screen Display is resumed after the stoppage at a timing when a predetermined length of time has elapsed from a stop of a control over the blur correction section in one of the electronically retained state and the mechanically retained state.

According to still another aspect of the present invention, an imaging method is provided for an imaging apparatus comprising an image sensor, a display section displaying an image from the image sensor, a shake detection section detecting a shake of the imaging apparatus, a blur correction section correcting a blur in an image due to the shake of the imaging apparatus, a driver section driving the blur correction section, and a mechanical retention section mechanically retaining the blur correction section. The method comprises the steps of, in an image blur correction function, mechanically retaining the blur correction section at a predetermined position during non-performance of an image blur correction and electronically retaining the blur correction section in a drivable state at a predetermined position during the image blur correction, and changing a display control over the display section when the blur correction section is transited from an electronically retained state to a mechanically retained state and/or from a mechanically retained state to an electronically retained state.

As described above, according to the imaging apparatus and method of the present invention, it is possible to smoothly transit the blur correction section correcting image blurs from the electrically retained state to the mechanically retained state and from the mechanically retained state to the elec-

BRIEF DESCRIPTION OF THE DRAWINGS

FIGS. 2A to 2D are a circuit diagram showing a schematic system configuration of the inside of the digital still camera according to the present invention;

FIG. 3 is a flowchart for operation of two modes of the digital still camera according to the present invention;

FIG. 6 shows a front view of a fixation casing of a lens barrel of the digital still camera according to the present invention;

FIG. 8A shows a back view of the fixation casing and FIG. 8B shows a back view thereof without a flexible printed circuit board;

FIG. 12A shows a bottom of a rotation conveying gear, FIG. 12B shows a cross sectional view of the rotation conveying gear along the curve C to C', FIG. 12C shows the rotation conveying gear when it is pushed up by a cam pin sliding up a slope portion, FIG. 12D shows the rotation conveying gear when it is most pushed up by the cam pin getting contact with a top flat portion, and FIG. 12E shows the rotation conveying gear when it is most pushed down by the cam pin passing through a wall portion and getting contact with a bottom flat portion;

FIG. 19A is a timing chart for the blur correction operation with two-step press and no flash at a still image shooting.

DETAILED DESCRIPTION OF THE PREFERRED EMBODIMENT

Hereinafter, embodiments of the present invention will be described in detail with reference to the accompanying drawings.

Figure 1A:
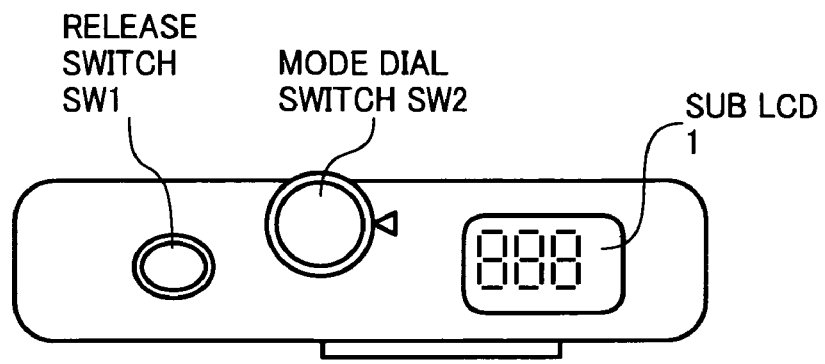
FIG. 1A shows a top view of a digital still camera according to the present invention.
Figure 1B:
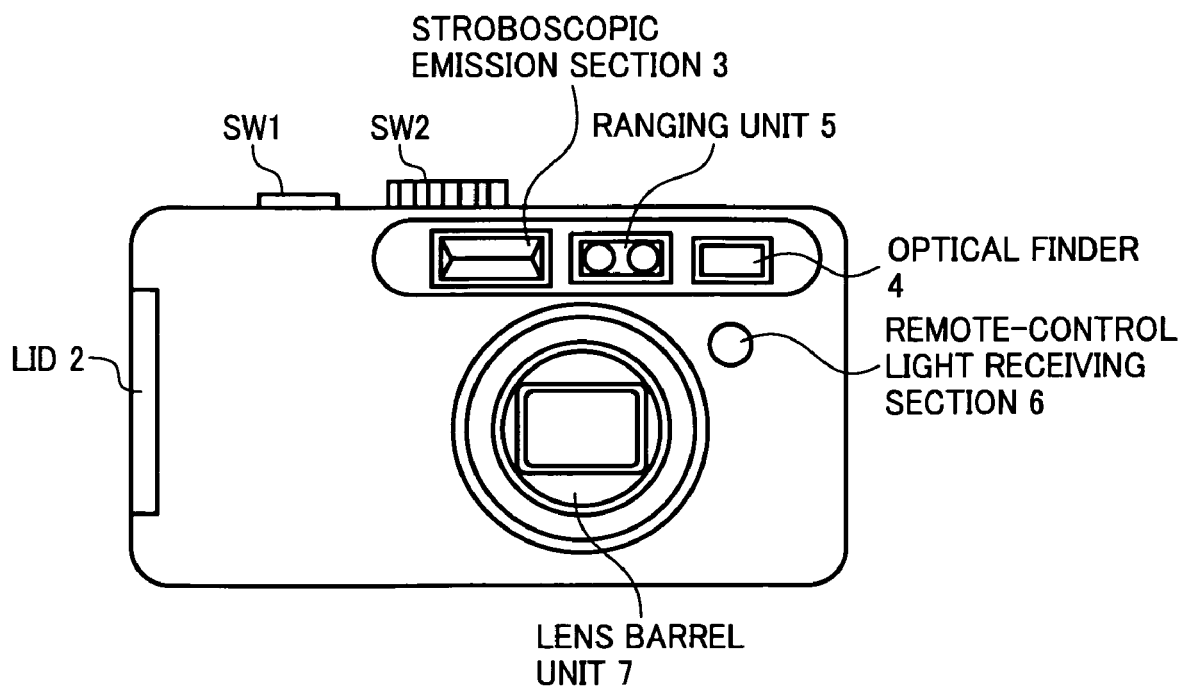
FIG. 1B shows a front view thereof.
Figure 1C:
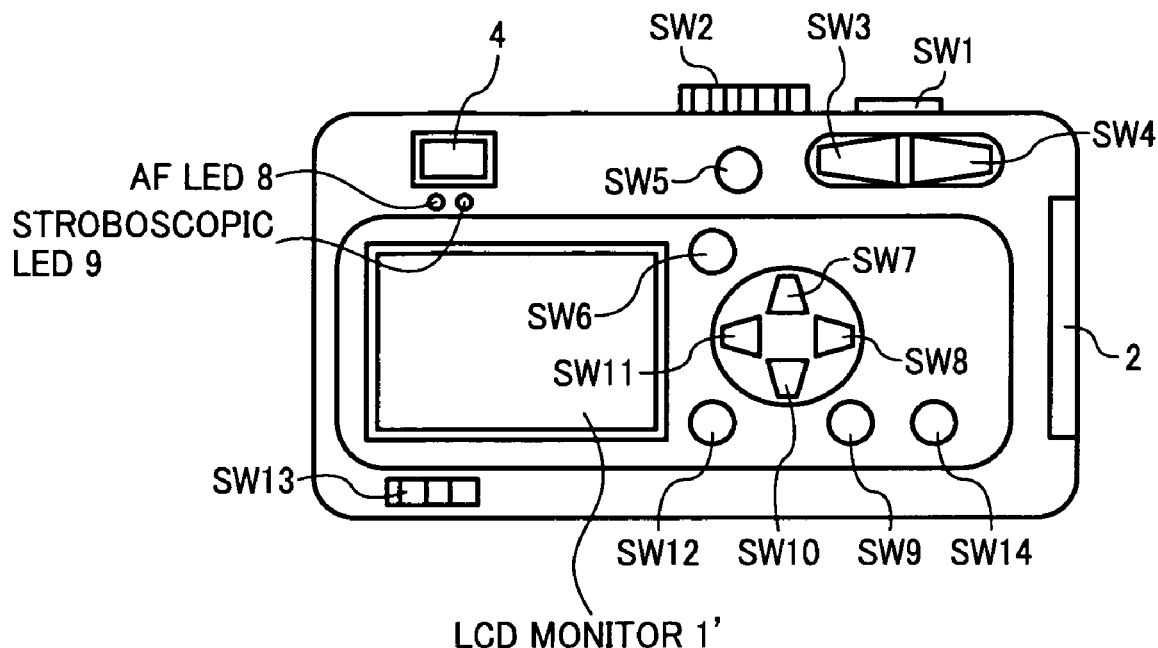
FIG. 1C shows a back view thereof.
Figure 2B:
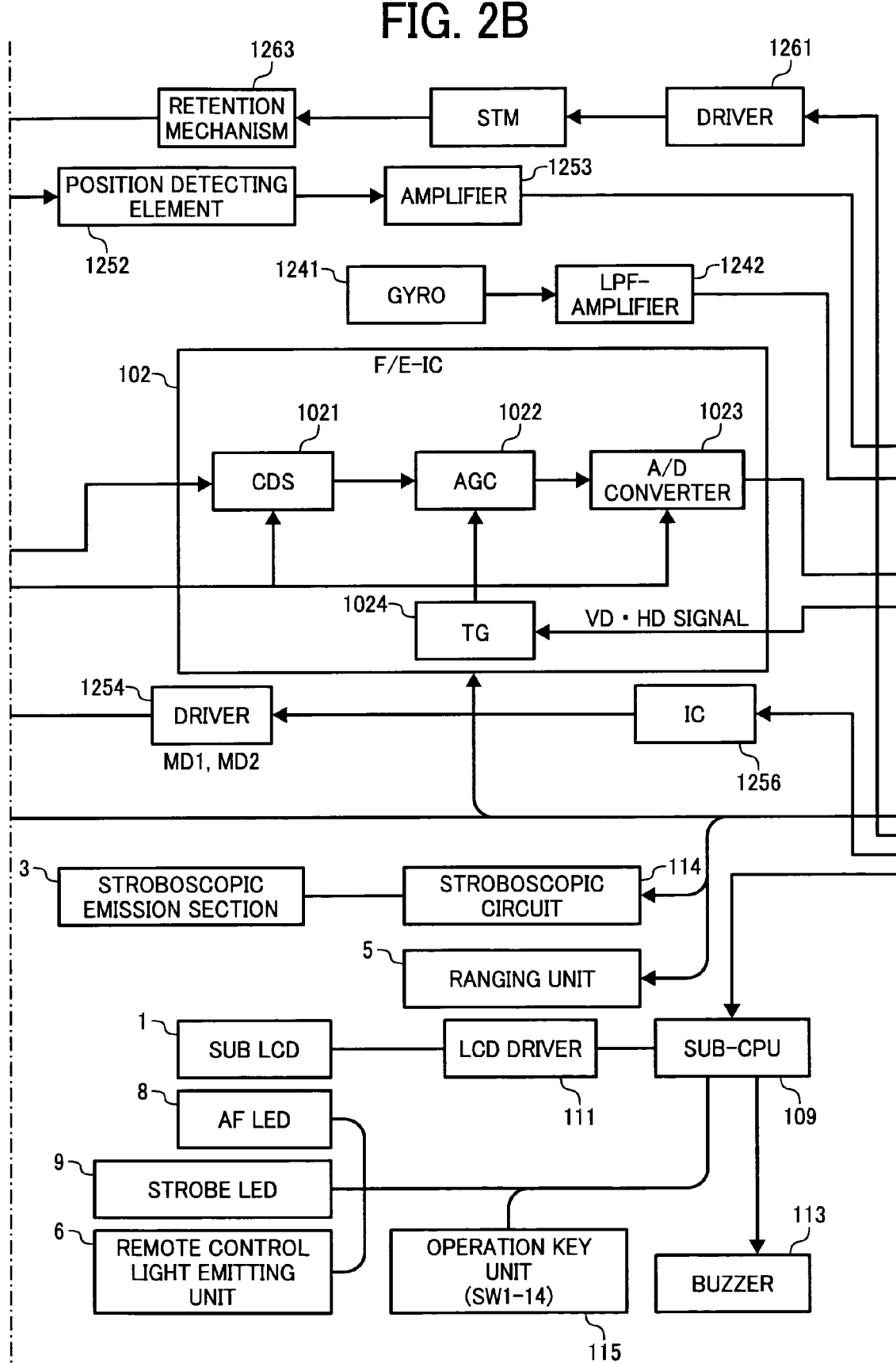
Figure 2C:
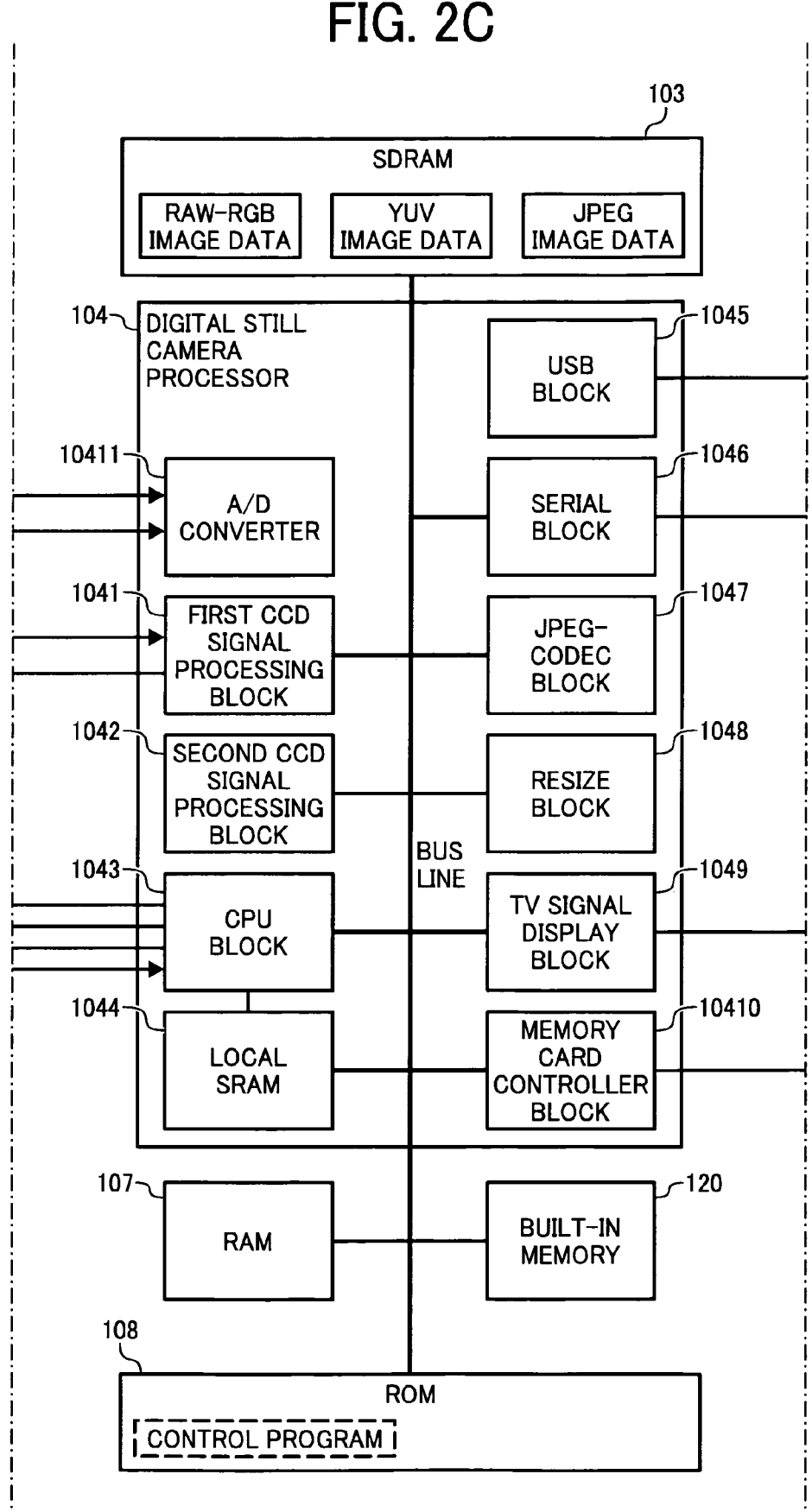
Figure 2D:
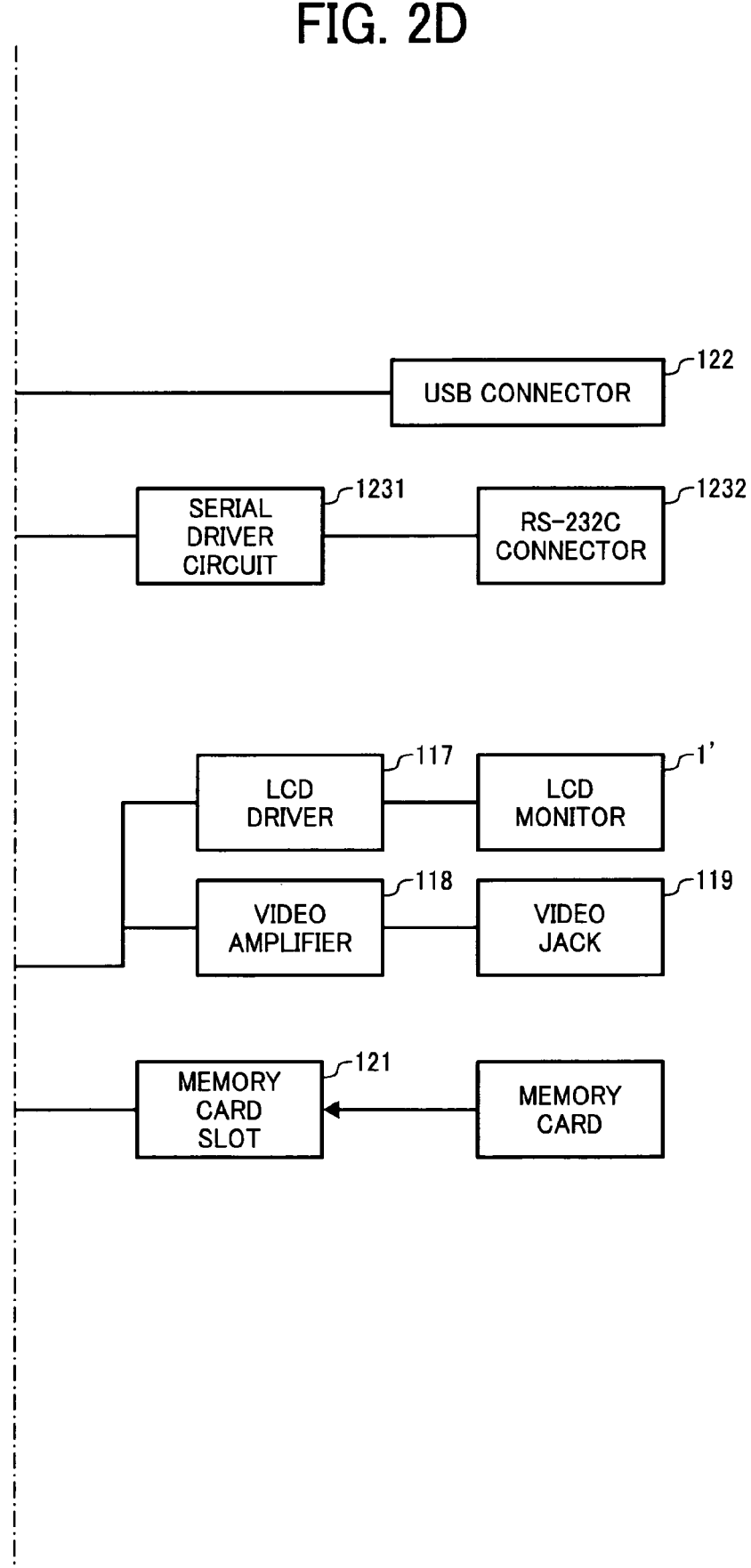

FIG. 1A is a front view of a digital still camera (hereinafter, referred to as digital camera) as one example of the imaging apparatus according to the present invention, FIG. 1B is a back view thereof, FIG. 1C is a top view thereof, and FIG. 2 is a circuit block diagram showing a schematic system configuration of the inside of the digital camera.

In FIG. 1, a release switch (release shutter) SW1, a mode dial switch SW2, and a sub liquid crystal display (sub LCD) 1 are disposed on a top plane of a camera body.

On the front plane (subject side) of the camera body, provided are a lens barrel unit 7 including a photographic lens, an optical finder 4, a stroboscopic emission section 3, a ranging unit 5, and a remote-control light receiving section 6.

On the back plane (photographer side) of the camera body, provided are a power-on switch SW13, an LCD monitor 1' (display section), an auto focus LED 8, a stroboscopic LED 9, a wide angle direction zoom switch SW3, a telephoto direction zoom switch SW4, a self timer setting/releasing switch SW5, a menu switch SW6, an upward movement/stroboscopic setting switch SW7, a rightward movement switch SW8, a display switch SW9, a downward movement/micro switch SW10, a leftward movement/image checkup switch SW11, an OK switch SW12, and a blur correction switch SW14. A lid 2 is provided for a memory card/battery loading room on a side plane of the camera body.

Next, the system configuration of the inside of the camera will be described with reference to FIGS. 1 and 2. The functions and operations of the respective members of the digital camera are well-known so that a description thereof will be omitted. In FIG. 2C, the number 104 denotes a digital still camera processor (hereinafter, referred to as a processor).

The processor 104 includes an A/D converter 10411, a first CCD signal processing block 1041, a second CCD signal processing block 1042, a CPU block 1043 (controller), a local SRAM 1044, an USB block 1045, a serial block 1046, a JPEG/CODEC block (for JPEG compression/decompression) 1047, a RESIZE block (for size expansion and reduction of image data by an interpolation processing) 1048, a TV signal display block (for image data conversion to a video signal for display on an external display device such as a liquid crystal monitor or a TV) 1049, and a memory card controller block (for control of a memory card for recording captured image data) 10410. These blocks are connected to each other via a bus line.

In the outside of the processor 104, disposed is an SDRAM 103 for storing therein RAW-RGB image data (with white balance setting and gamma setting made), YUV image data (with luminance data and color difference data conversion performed), and JPEG image data (compressed by JPEG). The SDRAM 103 is connected to the processor 104 via a memory controller (not shown) and a bus line.

In the outside of the processor 104, further disposed are a RAM 107, a built-in memory 120 (for storage of captured image data without a memory card installed in a memory card slot), and a ROM 108 having a control program, a parameter, etc., stored therein. These are connected to the processor 104 via a bus line.

Upon turning on of the power-on switch SW13 of the digital camera, the control program stored in the ROM 108 is loaded in the main memory (not shown) of the processor 104. The processor 104 controls the operation of the respective sections according to the control program and also temporarily stores control data, parameters, etc., in the RAM 107 or the like.

The lens barrel unit 7 includes a lens barrel constituted of an optical zoom system 71 having zoom lenses 71a, an optical focus system 72 having focus lenses 72a, an aperture stop unit 73 having an aperture stop 73a, and a mechanical shutter unit 74 having a mechanical shutter 74a. The zoom lenses 71a, focus lenses 72a, and aperture stop 73a constitute an optical photographic system. The optical axis of the optical photographic system is a Z axis, and a plane perpendicular to the Z axis is an X-Y plane.

The optical zoom system 71, optical focus system 72, aperture stop unit 73, and mechanical shutter unit 74 are driven by a zoom motor 71b, a focus motor 72b, an aperture stop motor 73b, and a mechanical shutter motor 74b, respectively. Each of these motors is driven by a motor driver 75, and the motor driver 75 is controlled by the CPU block 1043 of the processor 104.

A subject image is formed on the CCD 101 (image sensor) by each of the lens systems of the lens barrel unit 7, and the CCD 101 converts the subject image into an image signal to output the image signal to an F/E-IC 102. The F/E-IC 102 includes a CDS 1021 which performs correlated double sampling for eliminating noise from the image, an AGC 1022 for gain adjustment, and an A/D converter 1023 for analog/digital conversion. More particularly, F/E-IC 102 conducts a predetermined processing to the image signal to convert the analog image signal to the digital signal, and output the digital signal to the first CCD signal processing block 1041 of the processor 104.

These signal control processings are performed via a TG 1024 by a vertical synchronization signal VD and a horizontal synchronization signal HD output from the first CCD signal processing block 1041 of the processor 104. The TG 1024 generates a driving timing signal according to the vertical synchronization signal VD and the horizontal synchronization signal HD.

The CPU block 1043 of the processor 104 is configured to control audio recording operation of an audio recording circuit 1151. Audio is converted to an audio recording signal with a microphone 1153. The audio recording circuit 1151 records, according to a command, a signal which is obtained by amplifying the audio recording signal by a microphone amplifier (AMP) 1152. The CPU block 1043 controls operation of an audio reproducing circuit 1161 which is configured to reproduce an audio signal stored in a memory appropriately according to a command and outputs the reproduced signal to an audio amplifier 1162 so as to output sound from a speaker 1163.

The CPU block 1043 controls a stroboscopic circuit 114 so as to emit illumination light from the stroboscopic light emitting section 3. The CPU block 1043 also controls the ranging unit 5.

The CPU block 1043 is connected to a sub CPU 109 of the processor 104. The sub CPU 109 controls display on the sub LCD 1 via an LCD driver 117. The sub CPU 109 is also connected to the AFLED 8, stroboscopic LED 9, remote control light receiving section 6, an operation key unit having the operation switches SW1-SW14 and a buzzer 113.

The USB block 1045 is connected to a USB connector 122. The serial block 1046 is connected to an RS-232C connector 1232 via a serial driving circuit 1231. The TV signal display block 1049 is connected to the LCD monitor 1' through an LCD driver 117 and to a video jack (for connecting the camera to an external display device such as a TV) 119 via a video amplifier 118 (for conversion of a video signal output from the TV signal display block 1049 into 75Ω impedance). The memory card controller block 10410 is connected to the card contact point of a memory card slot 121.

The LCD driver 117 drives the LCD monitor 1' and also converts the video signal output from the TV signal display block 1049 into a signal for display on the LCD monitor 1'. The LCD monitor 1' is used for monitoring condition of a subject before photographing, checking captured images and displaying image data recorded in the memory card or the built-in memory 120.

The body of the digital camera is provided with a fixation casing constituting a part of the lens barrel unit 7. The fixation casing is provided with a CCD stage 1251 (blur correction section) movable in the X to Y direction. The CCD 101 is mounted on the CCD stage 1251 constituting a part of a blur correction mechanism. Detailed structures of the fixation casing and the CCD stage 1251 will be described later.

The CCD stage 1251 is driven by an actuator 1255 (driver section), and the driving of the actuator 1255 is controlled by a driver 1254 which includes a first coil drive MD1 and a second coil drive MD2. The driver 1254 is connected to an analog/digital converter IC1256 which is connected to the ROM 108 to receive control data therefrom.

The fixation casing is provided with a retention mechanism (mechanical retention section) 1263 which forcibly retains the CCD stage 1251 in a central position (original position) when the blur correction switch SW14 is powered off and the power-on switch SW13 is powered off. The retention mechanism 1263 is controlled by a stepping motor STM as an actuator which is driven by a driver 1261. Control data is input to the driver 1261 from the ROM 108.

The CCD stage 1251 is provided with a position detecting element 1252. The detection output of the position detecting element 1252 is input to an operational amplifier 1253 and amplified therein, and the amplified detection output is input to the A/D converter 10411. The camera body is provided with a gyro-sensor 1241 (shake detection section) which can detect the rotation of the camera in the pitch direction and yaw direction. The detection output of the gyro-sensor 1240 is input to the A/D converter 10411 via an LPF-amplifier 1242 which is also used as a low pass filter.

The digital camera has two modes, one for a monitoring operation and the other for a reproducing operation, and transits between the two modes. In the monitoring operation, a menu call-up is done to make various kinds of setting. In the reproducing operation, captured images are displayed on the LCD monitor 1'.

The operation of the digital camera proceeds according to the flowchart in FIG. 3. First, a decision as to whether the mode dial switch SW2 is set in a photographing mode is made (S1). When the photographing mode is set (Yes in S1), it proceeds to the monitoring operation (S2). After the monitoring operation, whether a photographing instruction is inputted or not is checked. With the instruction inputted (Yes in S2), the digital camera performs the photographing operation (S4), and thereafter returns to S2. With no instruction inputted (No in S2), it proceeds to S8 which is to be described later.

When the mode dial switch SW2 is not set in the photographing mode (No in S1), whether the mode dial switch SW2 is in the reproducing mode or not is decided (S5). With the reproducing mode set (Yes in S5), the digital camera performs reproducing operation to display a captured image on LCD monitor 1' (S6). With no reproducing mode set (No in S5), it performs an operation other than the photographing and reproducing operations (S7).

After S3, S6, and S7, a decision as to whether the power switch SW13 is pressed or not is made (S8). When it is pressed (Yes in S8), the operation completes. When it is not pressed (No in S8), the operation returns to S1 and continues.

Figure 4:
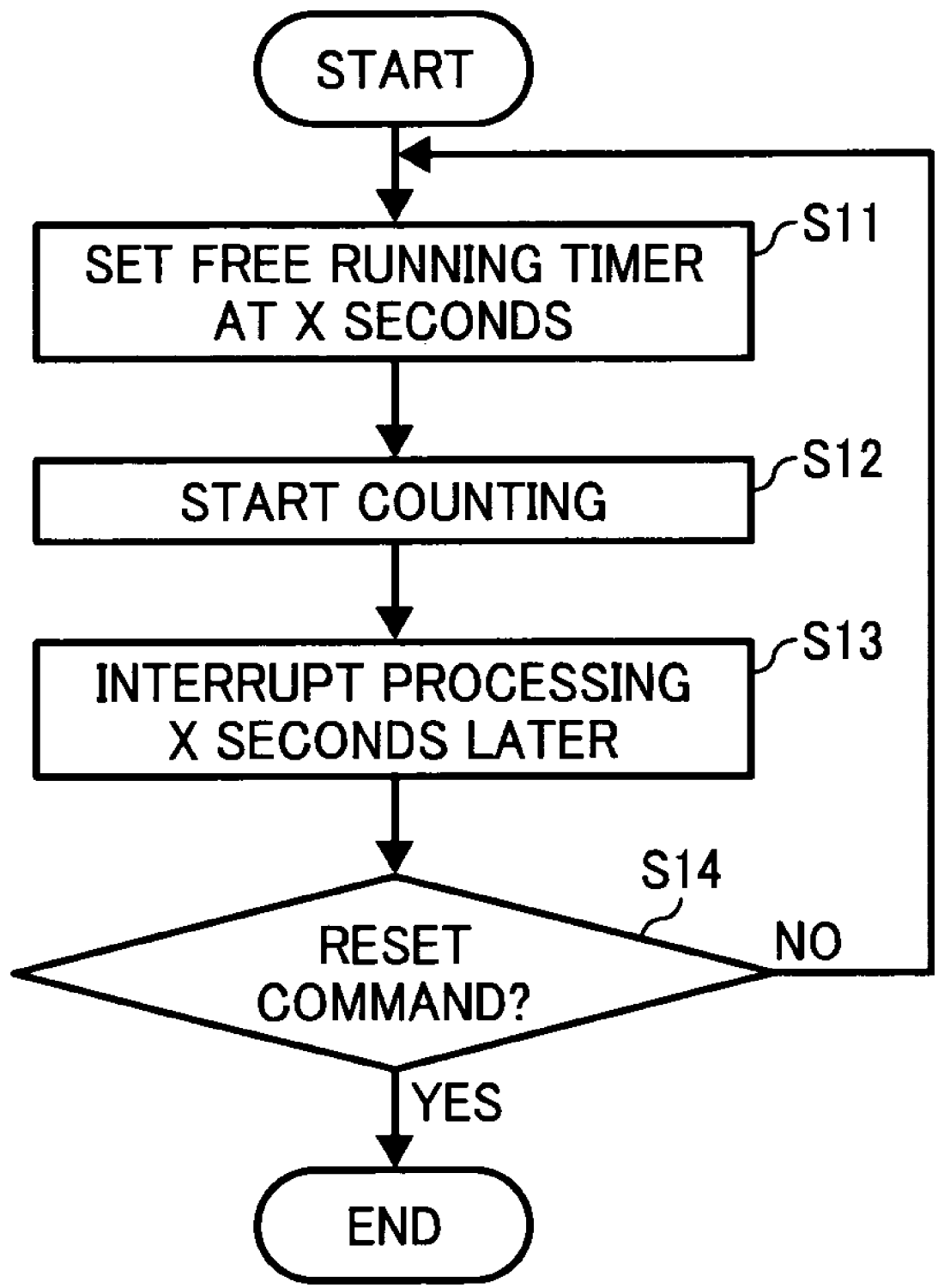
FIG. 4 is a flowchart for a free running timer showing operation of a timer function.

The processor 104 in FIG. 2C includes a timer function as a free running timer. FIG. 4 shows the operation of the timer. The free running timer generates an interrupt at a timing when the number of seconds set is counted down to zero. The number of seconds being counted down is referable in the register. The number of seconds is set at X to the timer (S11), and a predetermined interrupt processing is executed in the set X seconds (S13) after start of the counting down (S12).

The free running timer continues the interrupt processing repetitively with the interval of X seconds unless a reset command is given. That is, the free running timer operates according to presence or absence of the reset command. Whether the reset command is issued or not is decided (S14). Without the reset command issued (No in S14), it returns to S11 while with the reset command issued (Yes in S14), it completes the counting-down.

Figure 5:
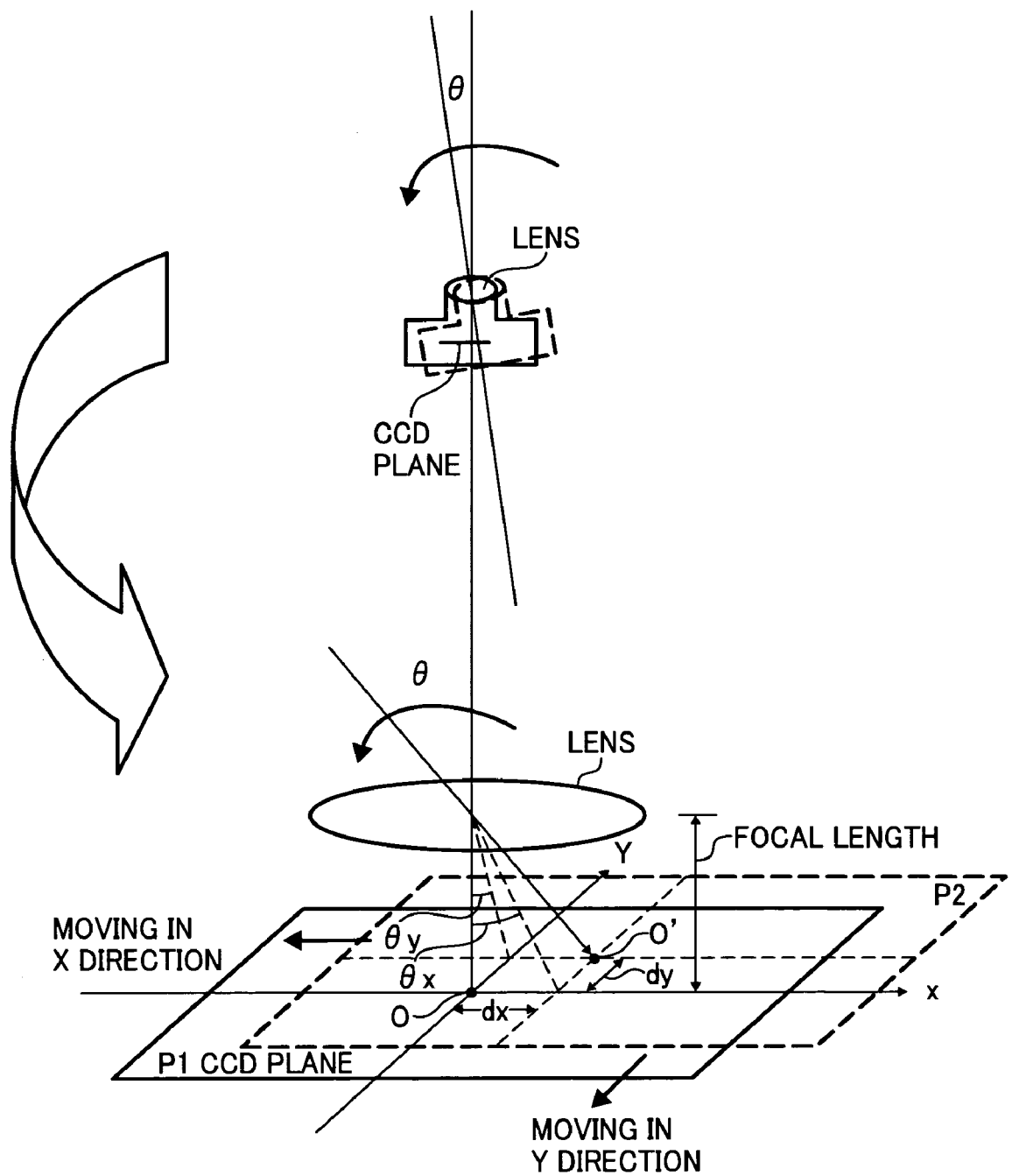
FIG. 5 shows a principle of a blur correction.

FIG. 5 shows a principle of the blur correction in which the CCD is shifted. In the drawing, an image of a subject is projected onto O when the image capturing plane (CCD plane) is at a position P1. However, when a blur due to hand shakes causes the digital camera to rotate by θx and θy, the image capturing plane is moved to a position P2, moving a projection position of the subject image to O'. In this case, the projection position of the subject on the image capturing plane can be returned to the original position by moving it in parallel by dx and dy to the position P2.

Figure 7:
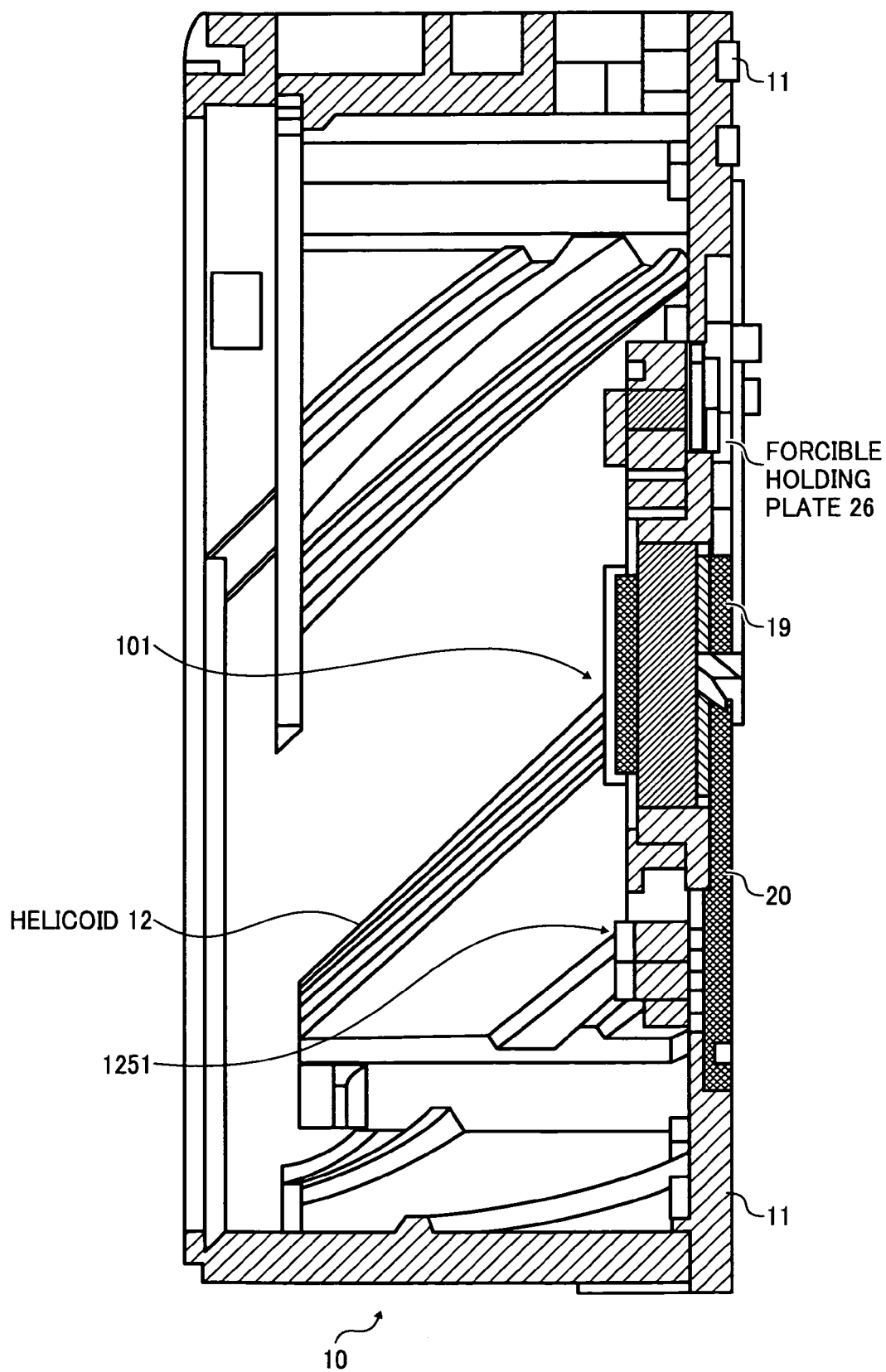
FIG. 7 shows a vertical cross section of the fixation casing of FIG. 6 along A to A' line.
Figure 8B:
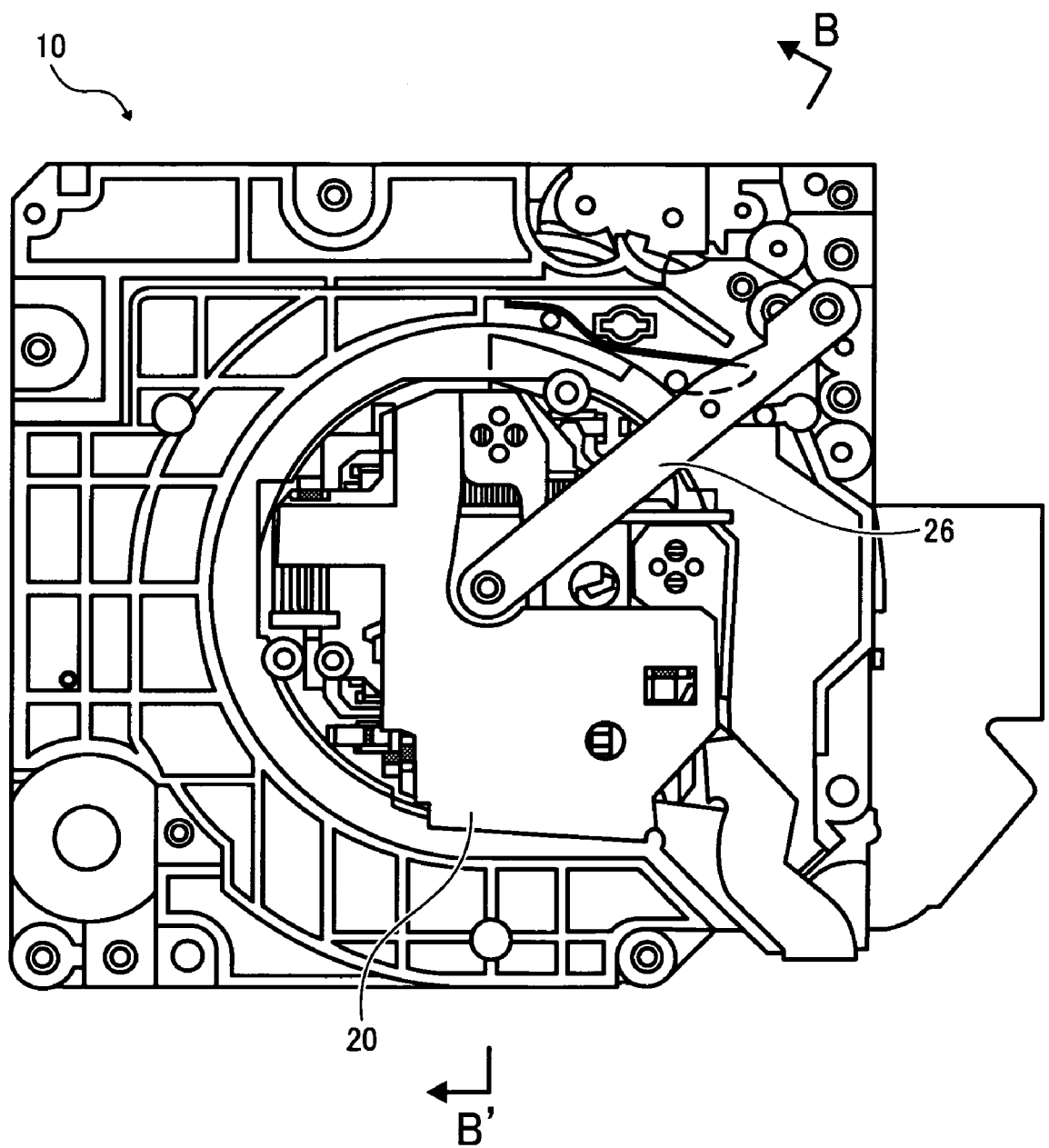

Next, the structure of the blur correction mechanism will be described with reference to FIGS. 6, 7, 8A and 8B which show the fixation casing 10 containing a plurality of lenses. FIG. 6 shows a front view thereof, FIG. 7 is a vertical cross section of the fixation casing of FIG. 6 along the A to A' line, and FIGS. 8A, 8B are back views thereof. The fixation casing is box-shaped and has an internal space to contain a lens barrel. It has a plate-like base member 11 of a substantially rectangular shape on the back side. On an internal circumferential wall thereof, a helicoid 12 is formed to reel in and reel out of the lens barrel. At least two corners of the fixation casing 10 are cut out, and a later-described stepping motor STM is fixed at one corner 10a, and a later-described flexible print circuit board 20 is folded back at the other corner 10b.

Figure 9:
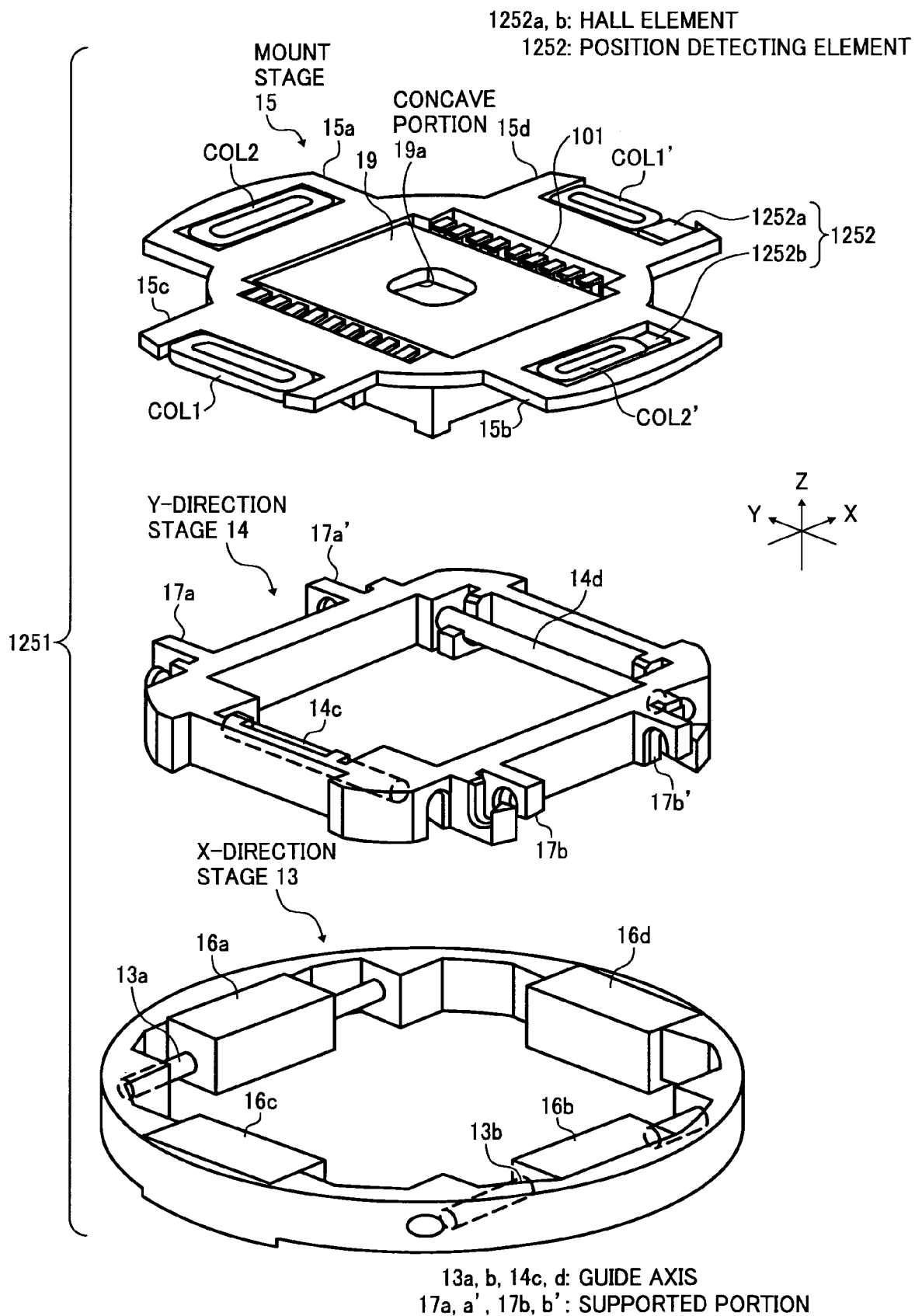
FIG. 9 shows an exploded perspective view of a CCD stage.

The CCD stage 1251 of FIG. 2A is mounted on the base member 11. The CCD stage is substantially constituted of an X-direction stage 13 of a ring shape and an Y-direction stage 14 of a rectangular shape, and a mount stage 15, as shown in FIG. 9.

The X-direction stage 13 is fixed to the base member 11. A pair of guide axes 13a, 13b extending to the X direction are provided with a distance in the Y direction on the X-direction stage 13. Also, four permanent magnets of rectangular solid shape 16a to 16d are provided in pairs thereon. A pair of permanent magnets 16a, 16b are disposed with a distance in parallel in the Y direction on the X-Y plane. Another pair of permanent magnets 16c, 16d are disposed with a distance in the X direction on the X-Y plane. In the present embodiment, it is configured that the pair of guide axes 13a, 13b penetrate through the pair of permanent magnets 16a, 16b, respectively. However, the configuration is not limited thereto, and the permanent magnets can be attached to the guide axes 13a, 13b.

A pair of guide axes 14c, 14d extending to the Y direction are disposed in the X direction with a distance on the Y-direction stage. Also, two pairs of supported portions 17a, 17a' and 17b, 17b' facing each other in the X direction are formed with a distance in the Y direction thereon. The two pairs of supported portions 17a, 17a' and 17b, 17b' are movably supported by the guide axes 13a, 13b, respectively, to enable the Y-direction stage 14 to move in the X direction.

The CCD 101 is fixed at the center of the mount stage 15 which is provided with a pair of coil fixing plates 15c, 15d protruding in the X direction and a pair of coil fixing plates 15a, 15b protruding in the Y direction. A pair of supported portions (not shown) facing each other in the Y direction are formed with a distance in the X direction on a same side as the image capturing plane of the CCD 101. The pairs of supported portions are movably supported by the guide axes 14c, 14d of the Y-direction stage, respectively, to enable the whole mount stage 15 to move in the X-Y direction.

The CCD 101 has a protective plate 19 attached on an opposite side to the image capturing plane. A tapered concave portion 19a is formed on the center of the protective plate 19. The action of the concave portion 19a will be described later.

The pair of coil fixing plates 15c, 15d have attached thereto flat, spiral coiled bodies COL1, COL1' which are connected in series, respectively. Likewise, the pair of coil fixing plates 15a, 15b have attached thereto flat, spiral coiled bodies COL2, COL2' which are connected in series, respectively.

The coiled bodies COL1, COL1' are disposed to face the permanent magnets 16c, 16d, respectively, and the coiled bodies COL2, COL2' are disposed to face permanent magnets 16a, 16b, respectively. The coiled bodies COL1, COL1' are used for moving the CCD 101 in the X direction while the coiled bodies COL2, COL2' are used for moving the same in the Y direction.

As shown in FIG. 8A, each of the coiled bodies COL1, COL1' has an iron-made magnetic bar attached to go across in the X direction so as to suppress shakiness of the stages and by attracting the stage with the magnets and the stage with the bar to each other by magnetic force.

In the present embodiment, a hall element is used for the position detecting element 1252. The coil fixing plate 15d is provided with a hall element 1252a, and the coil fixing plate 15b is provided with a hall element 1252b.

Figure 10:
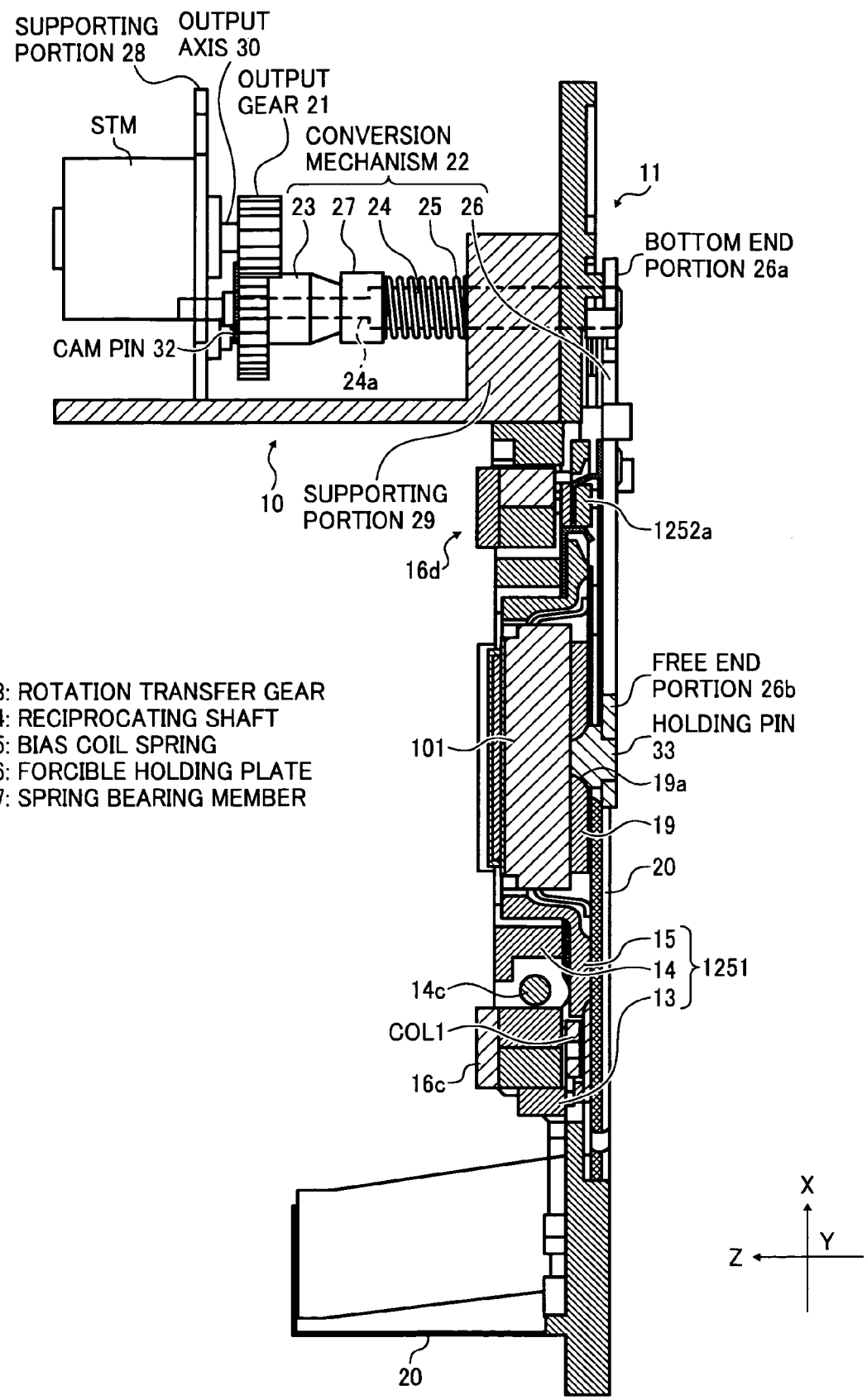
FIG. 10 shows a vertical cross section of the fixation casing along a B to B' line.

The CCD 101 is electronically connected with the F/E-IC 102 via the flexible print circuit board 20 (See FIG. 10). The hall elements 1252a, 1252b are electronically connected with the operational amplifier via the flexible print circuit board 20, and the coiled bodies COL1, COL1', COL2, and COL2' are electronically connected with the driver 1254 (FIG. 2B).

Figure 11A:
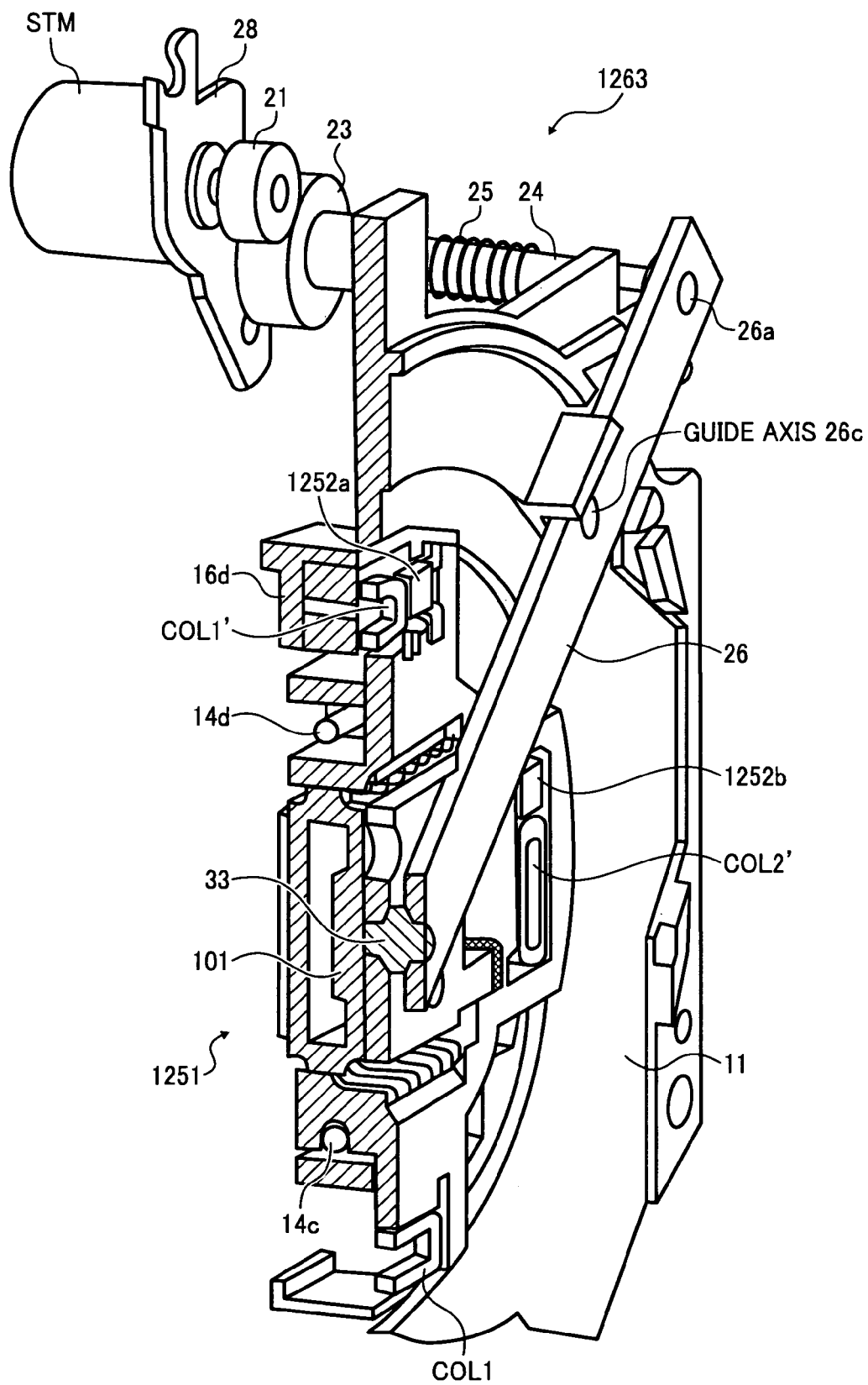
FIG. 11A is a perspective view of a forcible retention mechanism showing a connection relationship among a CCD stage, a stepping motor, and a conversion mechanism.
Figure 11B:
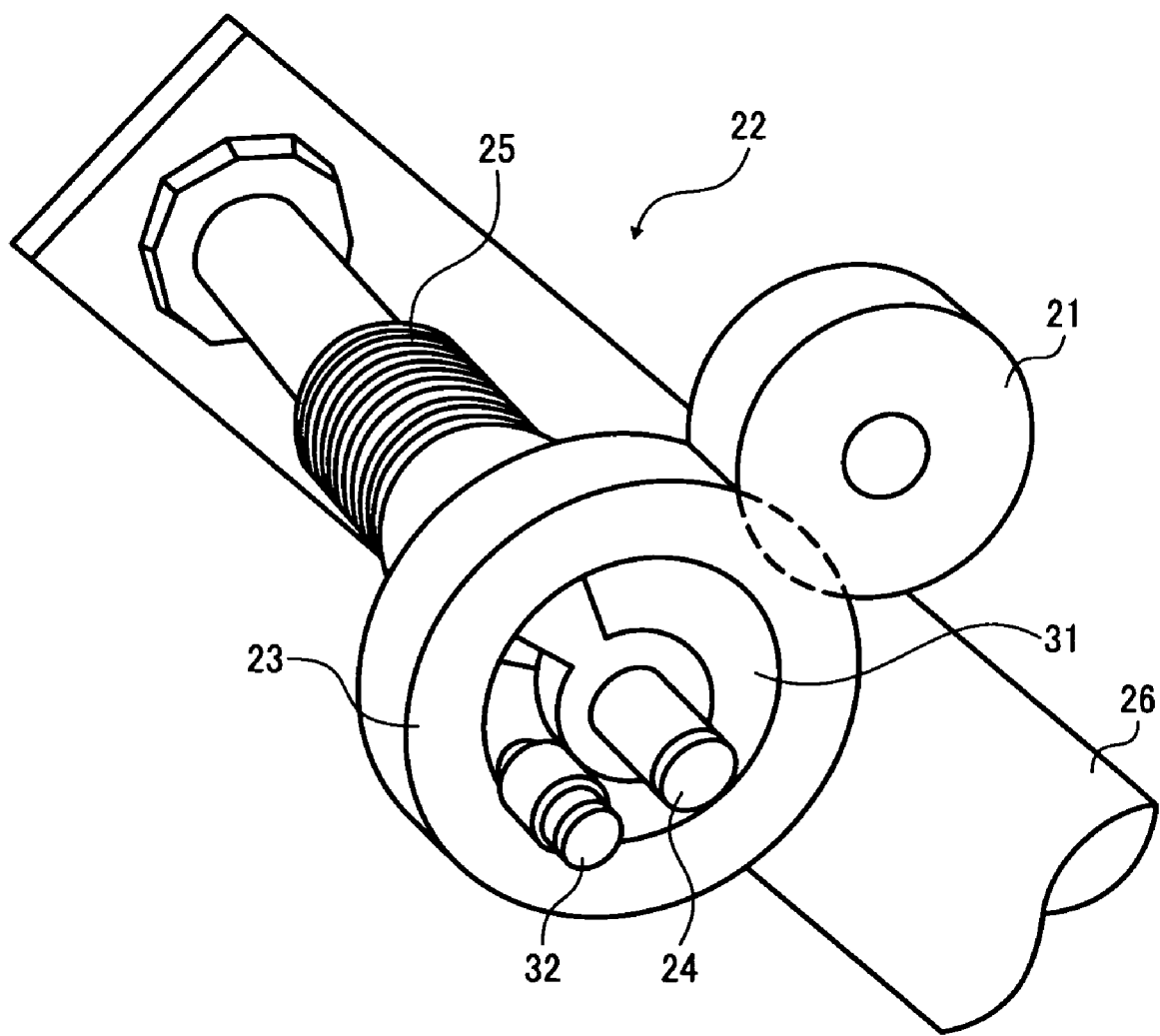
FIG. 11B is an enlarged perspective view of a portion of the conversion mechanism.

Next, a mechanical structure of the retention mechanism 1263 shown in FIG. 2 will be described in detail with reference to FIGS. 10, 11A, and 11B. The retention mechanism 1263 retaining the original position of the CCD stage 1251 includes the stepping motor STM. FIG. 10 is a vertical cross sectional view of the retention mechanism 1263 along the B to B' line of FIG. 8B, and FIGS. 11A and 11B are enlarged views thereof. The driving control over the stepping motor STM will be described later.

The stepping motor STM is provided in the corner 10a of the fixation casing 10 as shown in FIG. 6. The output axis 30 of the stepping motor STM has an output gear 21. Also, a conversion mechanism 22 to convert rotational movement of the motor to linear movement is provided in the corner 10a of the fixation casing 10.

The conversion mechanism 22 is substantially constituted of a rotation transfer gear 23, a reciprocating shaft 24, a biasing coil spring 25, a forcible holding plate 26, and a spring bearing member 27. A pair of supporting portions 28, 29 are formed in the corner 10a of the fixation casing 10 with a distance in the Z-axis direction. The supporting member 28 is composed of a motor fixing plate 28. The reciprocating shaft 24 is hung between the supporting member 29 and the motor fixing plate 28 and supported thereby. The rotation transfer gear 23 is positioned between the supporting portions 28, 29 to be rotatably supported by the reciprocating shaft 24 and be engaged with the output gear 21.

One end of the reciprocating shaft 24 penetrates through the supporting portion 29 to face the back side of the base member 11. The bias coil spring 25 is positioned between the spring bearing member 27 and the supporting portion 29 to bias the reciprocating shaft 24 toward the supporting portion 28. The reciprocating shaft 24 includes a step portion 24*a* which is engaged with the end of a shaft hole of the rotation transfer gear 23.

The rotation transfer gear 23 has a cam groove 31 at one end thereof as shown in FIGS. 12A to 12E. The cam groove 31 extends in a rotational direction of the rotation transfer gear 23 and is composed of a bottom flat portion 31*a*, a top flat portion 31*b*, and a slope plane 31*c* to continuously incline toward the top flat portion 31*b* from the bottom flat portion 31*a*. Between the bottom flat portion 31*a* and the top flat portion 31*b*, there is a steep wall 31*d* with which a cam pin (to be described later) is collided from a rotational direction.

A cam pin 32 is fixed to the supporting portion 28 (FIG. 10), and the edge of the cam pin 32 is slidably contact with the cam groove 31. A length of the bottom flat portion 31*a* in the rotational direction from the wall 31*d* to a slope start position 31*e* of the slope plane 31*c* is equivalent to 2 pulses of a rotation control signal of the stepping motor STM. A length of the slope plane 31*c* in the rotational direction from the slope start position 31*e* to a slope end position 31*f* through the top flat portion 31*b* is equivalent to 30 pulses of the rotation control signal of the stepping motor STM. Further, a length of the top flat portion 31*b* in the rotational direction from the slop end position 31*f* to the wall 31*d* is equivalent to 3 pulses of the rotation control signal of the stepping motor STM. 35 pulses of the rotation control signal correspond to a single rotation of the rotation transfer gear 23, and the reciprocating shaft 24 makes one reciprocation in the Z axis direction by one rotation of the rotation transfer gear 23.

Moreover, the forcible holding plate 26 is provided on the back side of the base member 11, and configured to extend long to the center of the CCD 101 as shown in FIGS. 10, 11A. A bottom end 26*a* of the forcible holding plate 26 is fixed to one end of the reciprocating shaft 24 while a tapered holding pin 33 is fixed to a free end 26*b* thereof. A guide axis 26*c* is protruded in the middle of the extension direction of the forcible holding plate 26.

The base member 11 shown in FIGS. 8A, 8B has formed thereon positioning protrusions 11*a*, 11*b*, a coil fixing protrusion 11*c*, and an engaging protrusion 11*d*. A coil portion 34*a* of a torsion coil spring 34 is fitted with the coil fixing protrusion 11*c*. One end 34*b* of the torsion coil spring 34 is engaged with the engaging protrusion 11*d* while the other end 34*c* thereof is engaged with the guide axis 26. The base member 11 has a guiding hole (not shown) to guide the guide axis 26.

The forcible holding plate 26 is made in contact with the positioning protrusion 11*a* by the torsion coil spring 34 and reciprocates to get close to or get away from the base member 11 (Z axis direction) in accordance with the reciprocation of the reciprocating shaft 24. The guide axis 26 functions to help the forcible holding plate 26 reciprocate in a stable position.

The holding pin 33 (fitting protrusion) functions to mechanically hold the mount stage 15 (FIG. 9) at the original position by fitting with the concave portion (fitting hole) 19*a*.

Figure 13A:
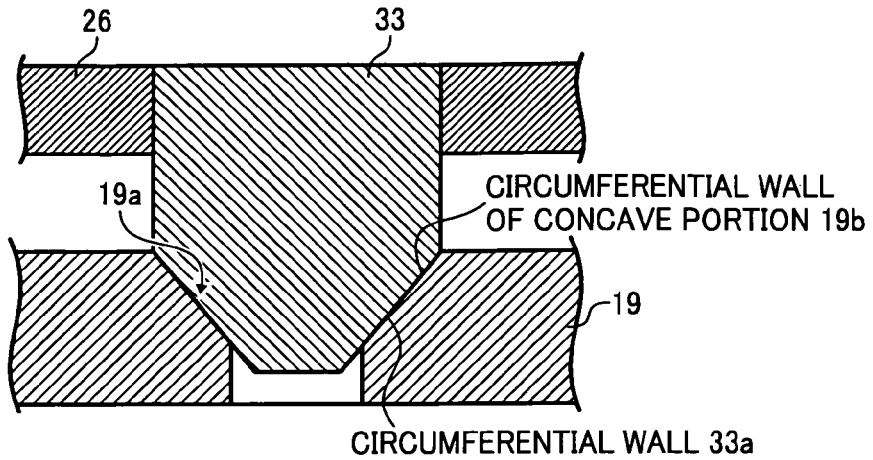
FIG. 13A is a partially extended cross section when a holding pin and a concave circumferential wall are closely fitted and FIG. 13B is the same when both of them are away from each other.
Figure 13B:
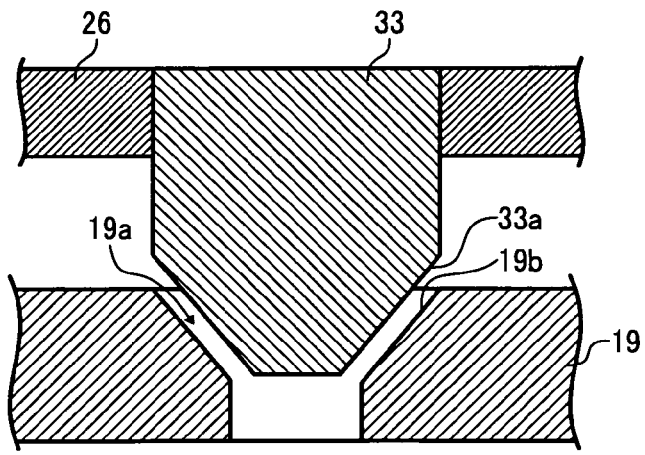

As shown in FIG. 13A, the cam pin is at a hold standby position (FIG. 12D) when a circumferential wall 33*a* of the holding pin 33 is closely fitted with a circumferential wall 19*b* of the concave portion of the protective plate 19. The cam pin is at a release standby position (FIG. 12E) when the circumferential wall 33*a* of the holding pin 33 gets away most from the circumferential wall 19*b* of the concave portion of the protective plate 19. The hold standby position of the cam pin 32 is also the original position at which the mount stage 15 is forcibly retained.

Next, movement of the CCD 101 will be described. The target moving point of the CCD 101 is decided based on an input from the gyro-sensor 1241 which is disposed to detect the rotation of the camera in the pitch and yaw directions. The A/D converter 10411 receives and A/D converts outputs from the gyro-sensor 1241 at an interval of T [s].

Here, where $\omega \text{yaw}(t)$ is a momentary angular velocity in the yaw direction, $\omega \text{pitch}(t)$ is a momentary angular velocity in the pitch direction, $\theta \text{yaw}(t)$ is a variance of angle in the yaw direction, $\theta \text{pitch}(t)$ is a variance of angle in the pitch direction, $D\text{yaw}(t)$ is an image moving amount in association with the rotation in the yaw direction, and $D\text{pitch}(t)$ is an image moving amount in association with the rotation in the pitch direction, the variance of angle of the CCD 101 in the yaw direction is obtained by the following expression (1):

$$\theta \text{yaw}(t) = \Sigma \omega \text{yaw}(i) \times T \text{ (i is zero from t), and}$$

the variance of angle of the CCD 101 in the pitch direction is obtained by the following expression (2):

$$\theta \text{pitch}(t) = \Sigma \omega \text{pitch}(i) \times T \text{ (i is zero from t)}.$$

The focal length f is determined from a zoom point zp and a focus point fp. The image moving amount in accordance with the rotation in the yaw direction is obtained by the following expression (3):

$$D\text{yaw}(t) = f \times \tan(\theta \text{yaw}(t))$$

The image moving amount in accordance with the rotation in the pitch direction is obtained by the following expression (4):

$$D\text{pitch}(t) = f \times \tan(\theta \text{pitch}(t))$$

Figure 14:
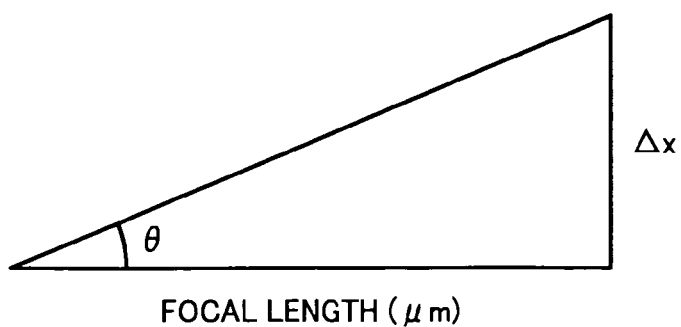
FIG. 14 shows a relationship between a focal length and a shift amount.
Figure 15:
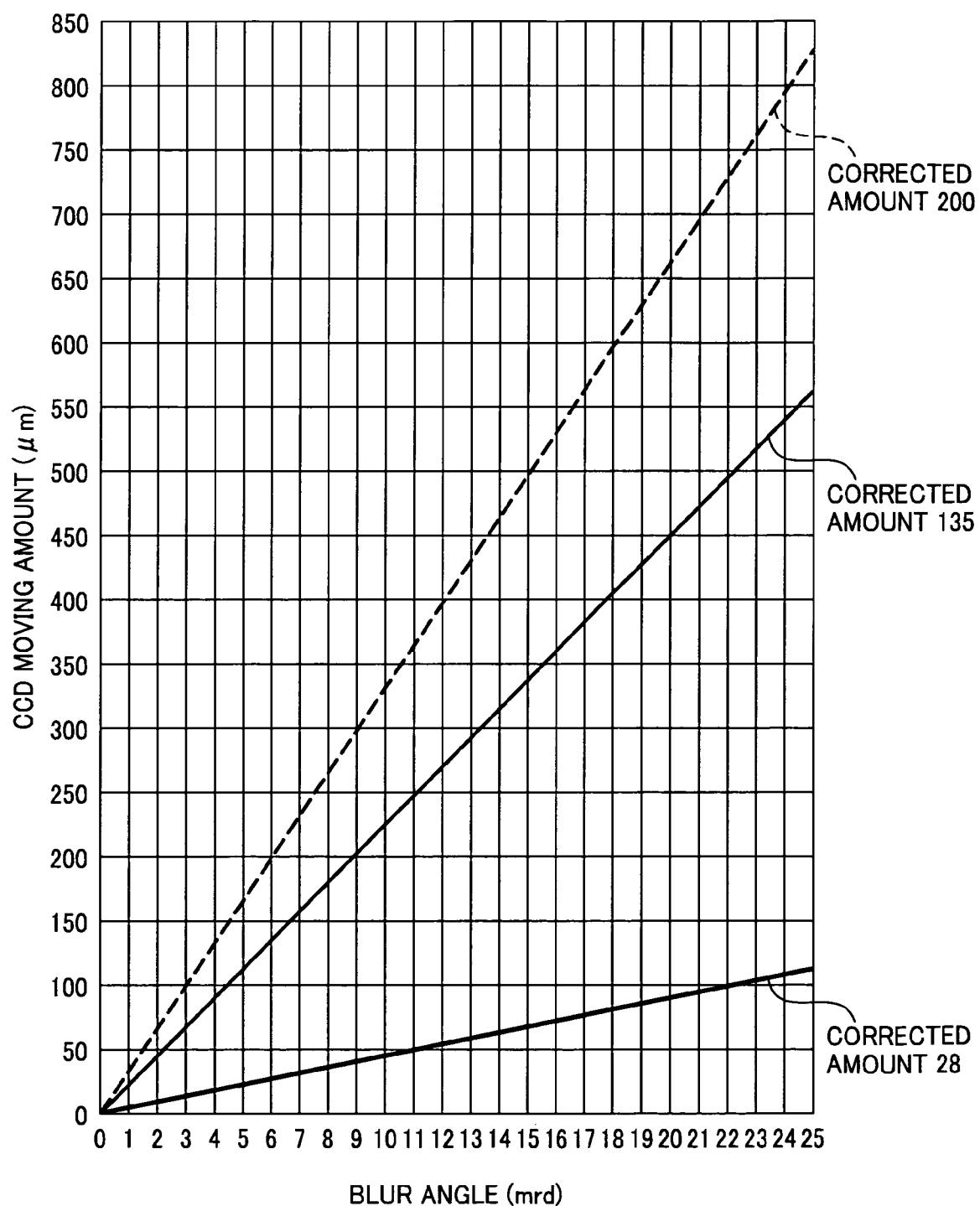
FIG. 15 shows a relationship between blur angles and corrected moving amount of the CCD.

The resultant of the expression (4) is to be the moving amount of the CCD 101. The CCD moving amount depending on the focal length is shown in FIG. 14, and a relationship between a blur angle and the CCD moving amount is shown in FIG. 15 and Table 1.

TABLE 1

BLUR ANGLE AND CCD MOVING AMOUNT

| 35 mm FOCAL LENGTH | 28 | 135 | 200 |
|---|---|---|---|
| ACTUAL FOCAL LENGTH | 4.7 | 22.6 | 33.5 |

| | CORRECTED AMOUNT (ONE SIDE) | | |
|---|---|---|---|
| BLUR ANGLE (mrad) | 28 | 135 | 200 |
| 0 | 0 | 0 | 0 |
| 0.5 | 2 | 11 | 17 |
| 1 | 5 | 23 | 34 |
| 1.5 | 7 | 34 | 50 |
| 2 | 9 | 45 | 67 |
| 2.5 | 12 | 57 | 84 |
| 3 | 14 | 68 | 101 |
| 3.5 | 16 | 79 | 117 |
| 4 | 19 | 91 | 134 |

TABLE 1-continued

BLUR ANGLE AND CCD MOVING AMOUNT

| | | | |
|---|---|---|---|
| 4.5 | 21 | 102 | 151 |
| 5 | 23 | 113 | 168 |
| 5.5 | 26 | 125 | 184 |
| 6 | 28 | 136 | 201 |
| 6.5 | 31 | 147 | 218 |
| 7 | 33 | 158 | 235 |
| 7.5 | 35 | 170 | 252 |
| 8 | 38 | 181 | 268 |
| 8.5 | 40 | 192 | 285 |
| 9 | 42 | 204 | 302 |
| 9.5 | 45 | 215 | 319 |
| 10 | 47 | 226 | 335 |
| 10.5 | 49 | 238 | 352 |
| 11 | 52 | 249 | 369 |
| 11.5 | 54 | 260 | 386 |
| 12 | 56 | 272 | 403 |
| 12.5 | 59 | 283 | 419 |
| 13 | 61 | 294 | 436 |
| 13.5 | 63 | 306 | 453 |
| 14 | 66 | 317 | 470 |
| 14.5 | 68 | 328 | 486 |
| 15 | 70 | 340 | 503 |
| 15.5 | 73 | 351 | 520 |
| 16 | 75 | 362 | 537 |
| 16.5 | 77 | 374 | 554 |
| 17 | 80 | 385 | 570 |
| 17.5 | 82 | 396 | 587 |
| 18 | 85 | 408 | 604 |
| 18.5 | 87 | 419 | 621 |
| 19 | 89 | 430 | 637 |
| 19.5 | 92 | 442 | 654 |
| 20 | 94 | 453 | 671 |
| 20.5 | 96 | 464 | 688 |
| 21 | 99 | 476 | 704 |
| 21.5 | 101 | 487 | 721 |
| 22 | 103 | 498 | 738 |
| 22.5 | 106 | 510 | 755 |
| 23 | 108 | 521 | 772 |
| 23.5 | 110 | 532 | 788 |
| 24 | 113 | 543 | 805 |
| 24.5 | 115 | 555 | 822 |
| 25 | 117 | 566 | 839 |

Figure 16:
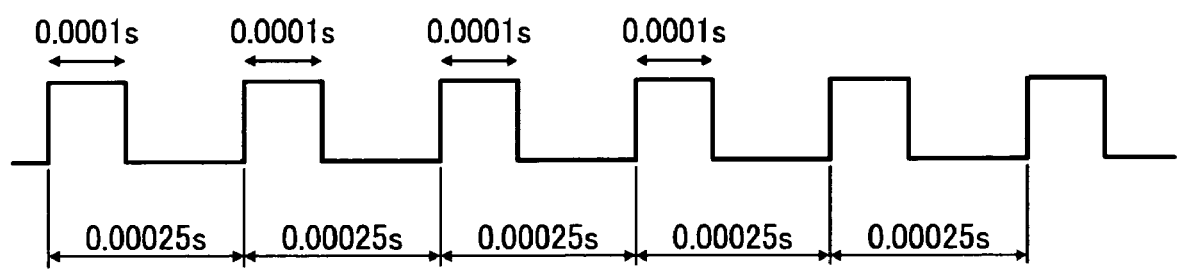
FIG. 16 is a timing chart for servo control over the CCD with a cycle of 0.0001 [s]
Figure 17:
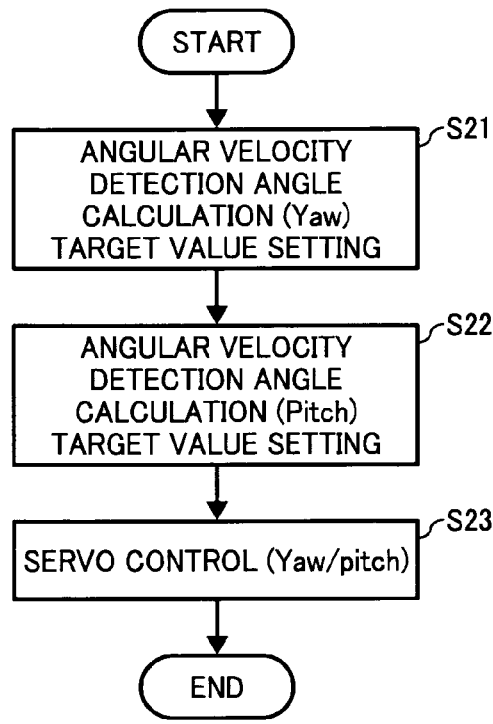
FIG. 17 is a flowchart for servo control operation.
Figure 18:
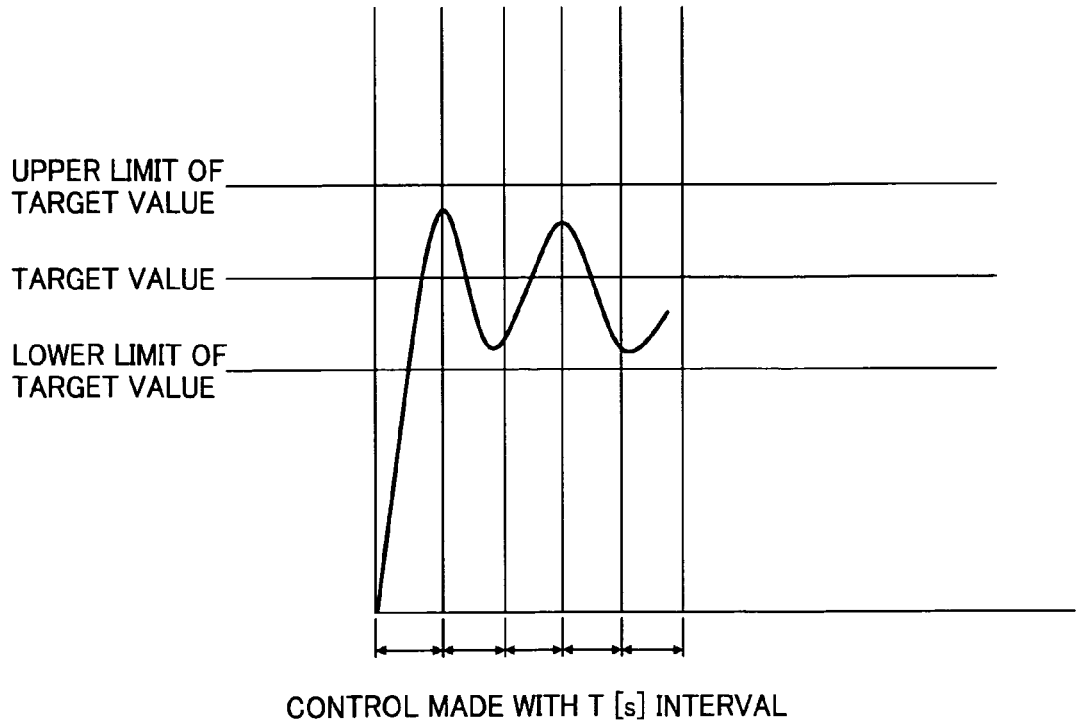
FIG. 18 shows movement of the CCD to a target position.

FIG. 16 is a timing chart for a cycle of a servo control to move the CCD. FIG. 17 is a flowchart for servo control operation. According to the present embodiment, at a cycle T of 0.00025 [s], the angular velocity detection and angle calculation are made in the yaw direction to set a target value therefor (S21). Similarly, the angular velocity detection and angle calculation are made in the pitch direction to set a target value therefor (S22), to perform the servo control of the CCD 101 in both of the yaw and pitch directions (S23). As a result, the CCD 101 moves to the target position as shown in FIG. 18. Note that the time taken for the operation in the flowchart of FIG. 17 is 0.0001 [s] (FIG. 16).

In the servo control, the shorter the length of the cycle T[s], the closer to the target value the control value becomes. The interval for blur correction is the shortest when the cycle T is set to 0.0001 [s] (for execution of correction operation), for example, however, CPU occupancy of the blur correction cannot be 100% since the CPU operates for other operations than the blur correction. Further, too high CPU occupancy of the blur correction affects other operations. In order to avoid the problem from occurring, the cycle T is set to 0.00025 [s] and the CPU occupancy of the blur correction is set at 40% in the present embodiment. Processing to keep the CCD at the original position by the servo control (centering), and blur correction at the exposure are also performed at the cycle T of 0.00025 [s].

Figure 19B:
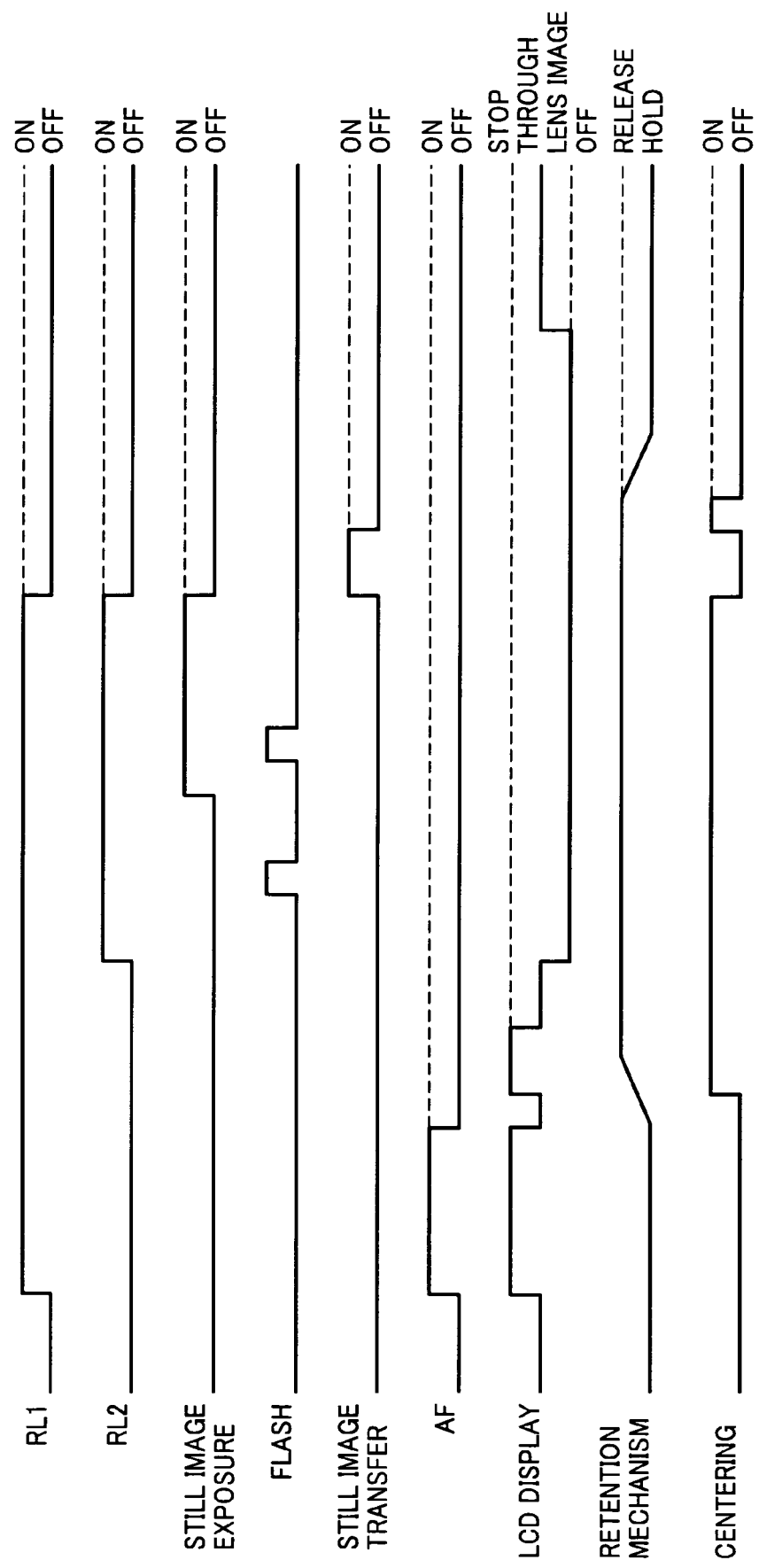
FIG. 19B is a timing chart for the blur correction operation with two-step press and flash at a still image shooting.

FIGS. 19A, 19B show timing charts for operation at still image shooting. Upon a press to the release switch SW1 of FIG. 1A and detection of a half-pressed state (RL1, first release state) thereof, the retention mechanism 1263 is released from holding the CCD stage 1251 (FIG. 2) and thereafter the CCD stage is electronically controlled to remain at the original position (centering). Upon a full press to the release switch SW1 and detection of a fully pressed state (RL2, second release state), the CCD stage 1251 is moved for the blur correction until the exposure. Upon completion of the exposure, the centering of the CCD stage starts again. Upon a stop of the centering, the CCD stage is fixedly held. The CPU block 1043 controls the processing for the first and second release states via the sub CPU 109.

In FIG. 19A, when the release switch SW1 is half-pressed and the first release state ends, the retention mechanism 1263 releases the CCD stage 1251, and the electronic retention control (centering) to the CCD 1251 starts. Then, upon completion of the exposure to a still image in the second release state, the CCD stage 1251 is stopped from moving. After transfer of the still image, the electronic retention control over the CCD stage 1251 starts again.

Finally, a decision is made as to whether the electrical retention control over the CCD stage 1251 is completed. Upon the completion, the centering is stopped and the CCD 1251 is retained by the retention mechanism 1263, completing the entire operation.

Figure 20:
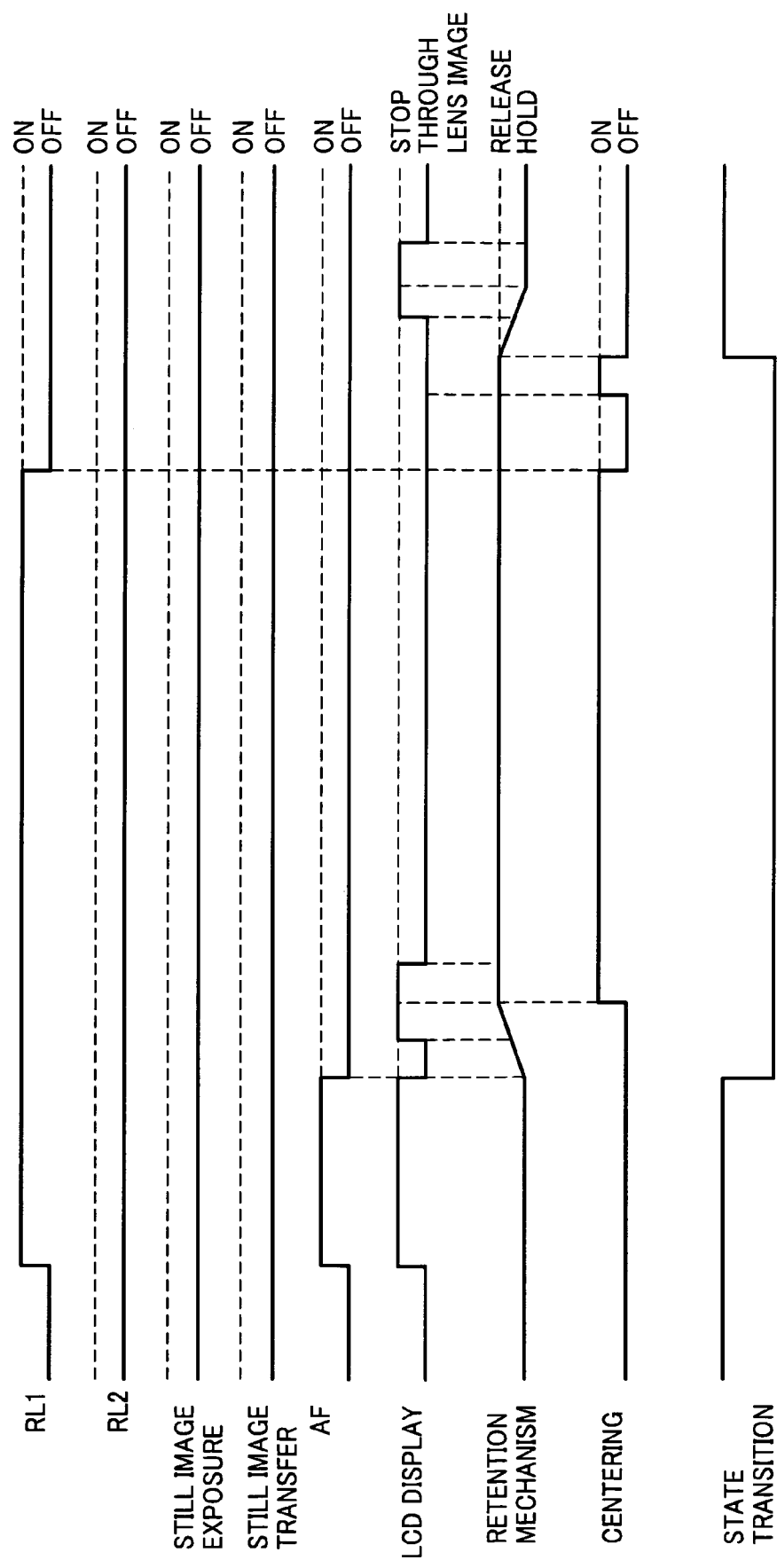
FIG. 20 is a timing chart for the blur correction operation from on to off of the first release state.

FIG. 20 is a timing chart showing on to off of the first release state. While the release switch SW1 is in the first release state, the retention mechanism is released from the retaining after the AF operation, and then the centering of the CCD 1251 stage starts. In the middle of the retention of the retention mechanism 1263, a display on the LCD monitor 1' is stopped. In a predetermined time after the start of the centering, image update on the LCD monitor 1' is resumed. Moreover, while the release switch SW1 is not in the first release state, the centering is stopped, and then the retention mechanism 1263 starts the retention operation. In the middle of the retention operation, the LCD display is stopped. In a predetermined time after the completion of the retention operation, the image display is resumed on the LCD monitor 1'.

Figure 21:
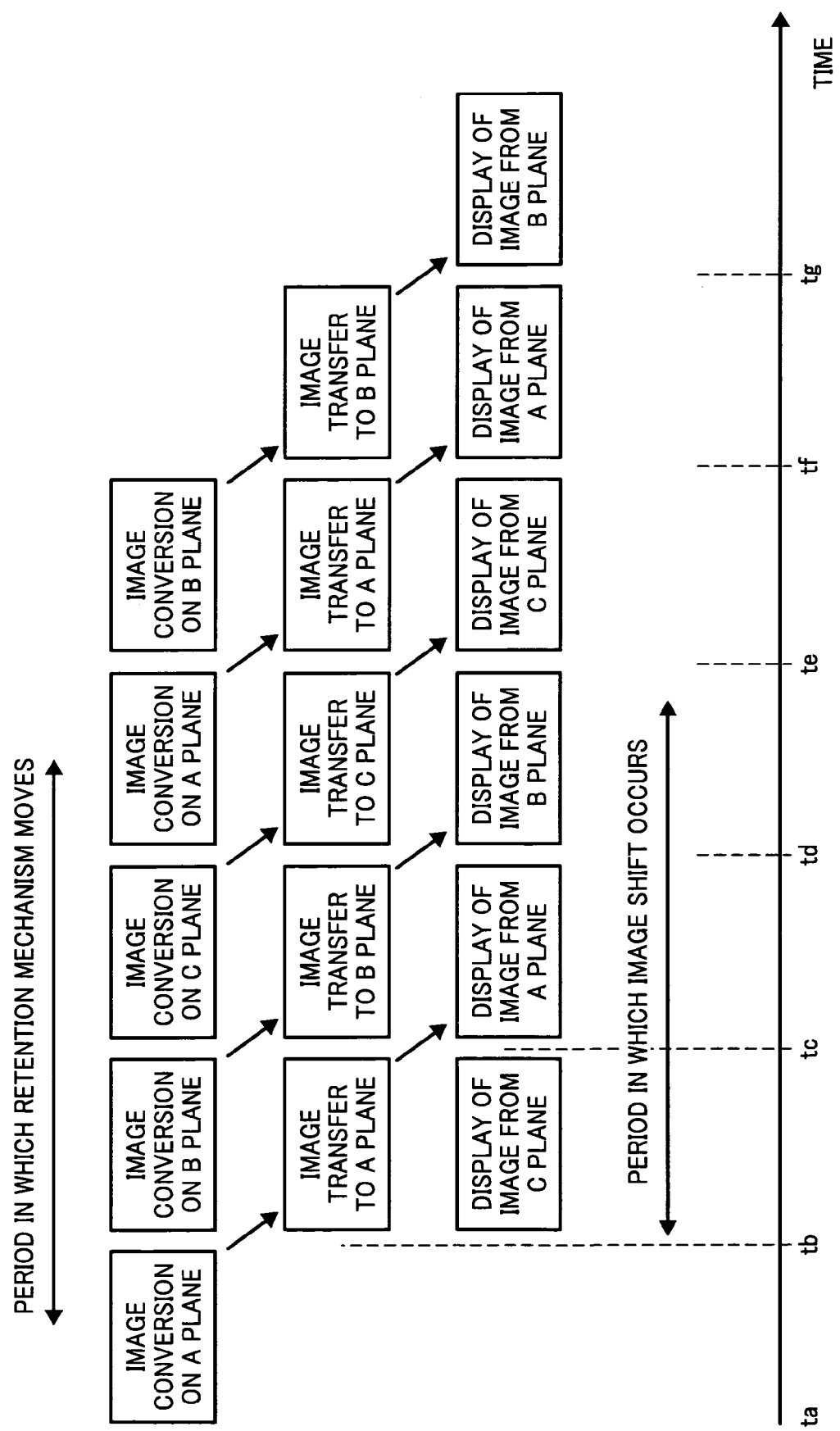
FIG. 21 shows a flow of monitored images.
Figure 22:
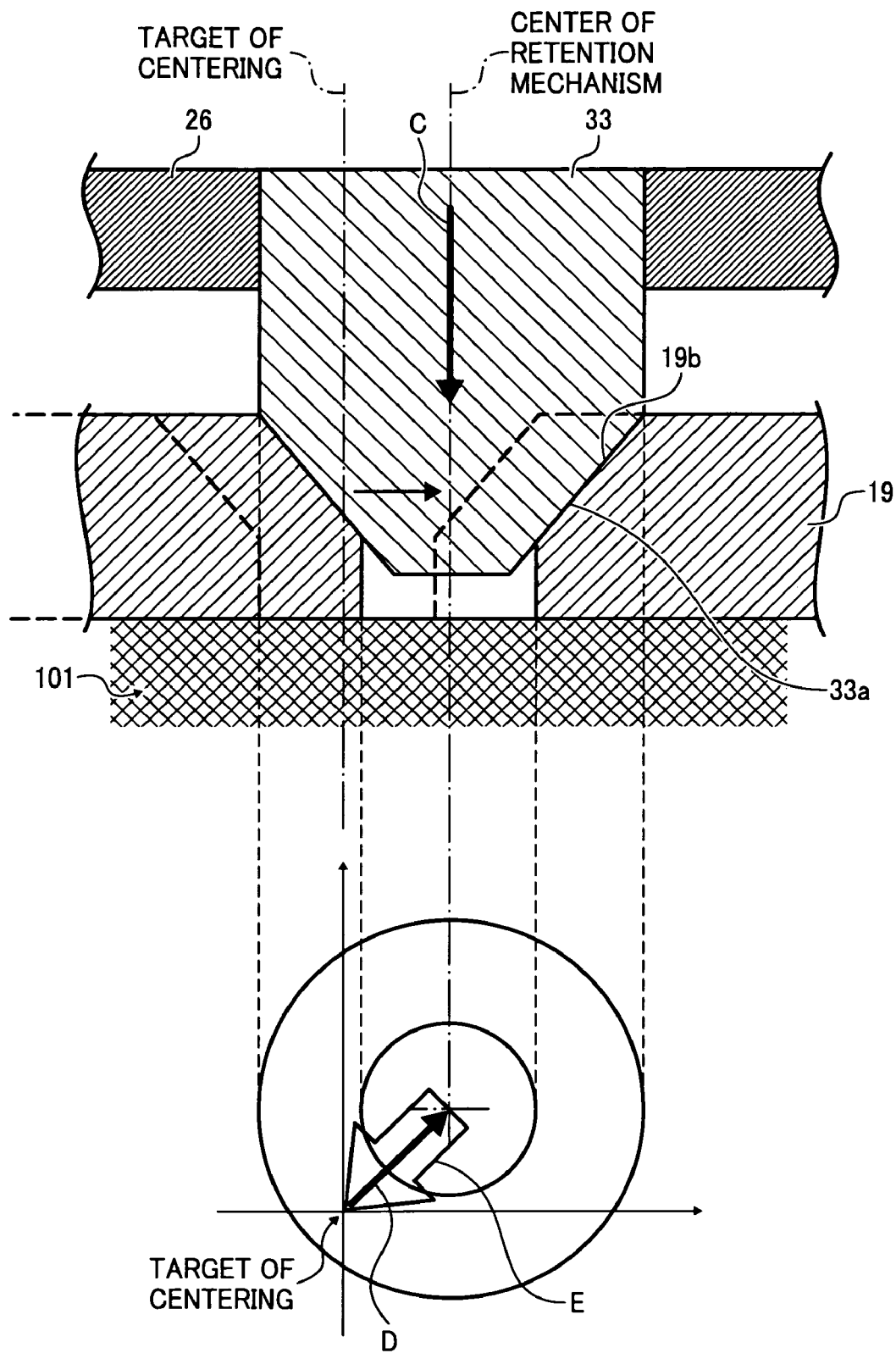
FIG. 22 shows operation for the mechanical retention.

FIGS. 21, 22 show a flow of processing to through-the-lens images according to the present embodiment. The SDRAM 103 includes three planes, A, B, and C. The images from the CCD 101 in FIG. 2 are repetitively received on the planes thereof in the order of A, B, C. The image to be displayed on the LCD monitor 1' is the latest received image. That is, while an image is being transferred to the B plane, the LCD monitor 1' displays an image from the A plane, and at the same time the CCD 101 makes a photoelectrical conversion of an image for the C plane. At a timing at which an image transfer is started, it makes a next photoelectrical conversion, and an image on the LCD monitor 1' is changed. Accordingly, there is a time lag between a live actual scene and an image thereof on the LCD monitor 1'.

In the present embodiment, at a start of the release of the mechanical retention of the blur correction section (or from the stop of the centering), image update can be stopped properly by keeping a next image displayed. To stop the image update, the image on the LCD monitor 1' is not switched to a next image but continuously displayed, and the images after the conversion are inhibited from being transferred from the CCD 101 to the SDRAM 103.

In FIG. 21, for example, when the release of the mechanical retention starts (the centering stops) at time ta, the image from the C plane displayed at time tb remains displayed while the image after the conversion is inhibited from being transferred to the B plane as well as the image form the A plane of the SDRAM 103 to the LCD monitor 1'. Then, at end of the release of the mechanical retention (completion of the retention mechanism's retention) (time td), an image for the B plane converted at next time te is allowed to be transferred to the SDRAM 103. The image display is updated such that an image is transferred to the B plane of the SDRAM 103 at time tf and displayed on the LCD monitor 1' at time tg. Accordingly, it is possible to make a transition of the CCD stage from the mechanically retained state to the electronically retained state and from the electronically retained state to the mechanically retained state without causing the image shifts on the LCD monitor.

Figure 23:
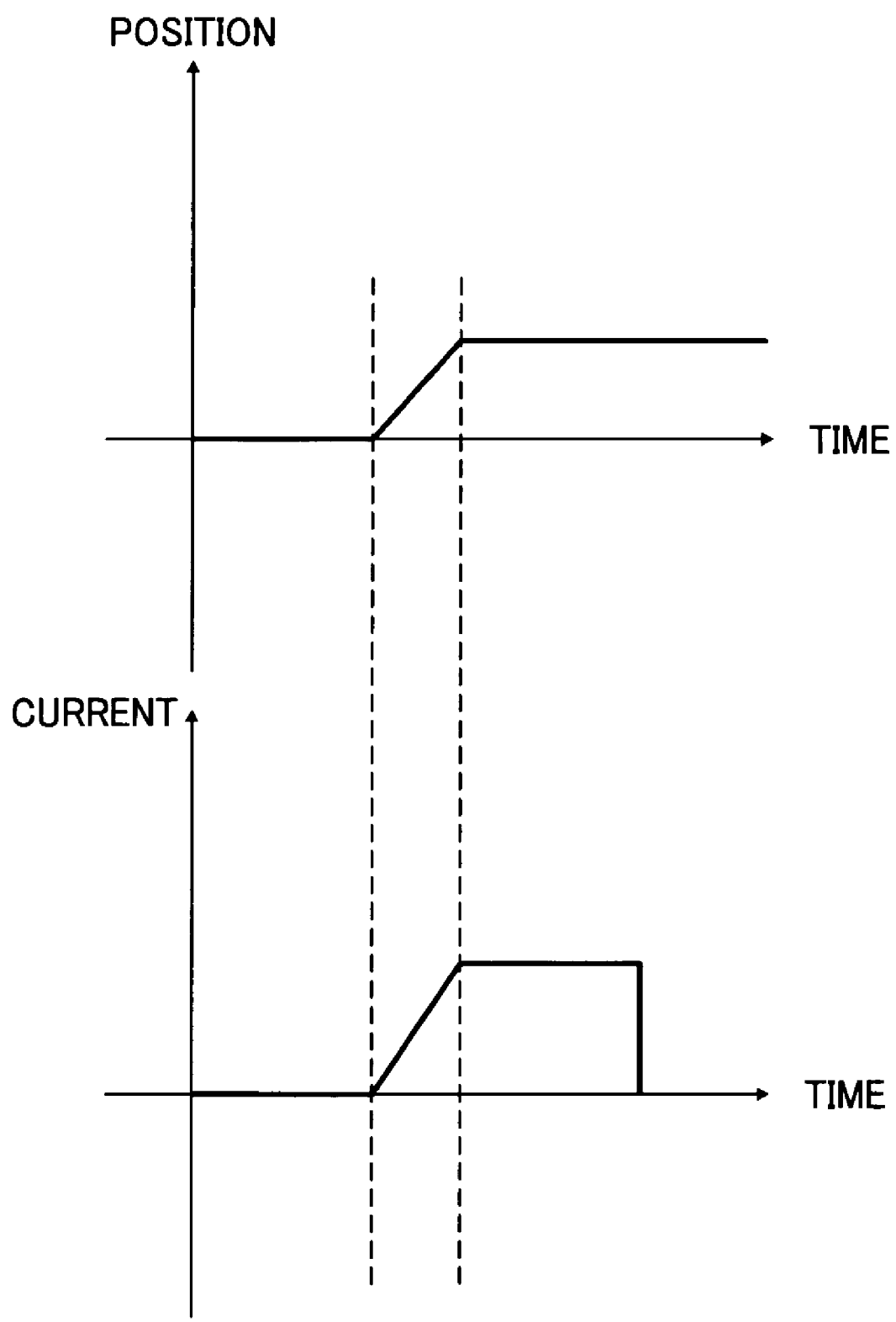
FIG. 23 shows changes in position and current of the CCD during the centering.

FIG. 22 shows the mechanical retention of the CCD 101. During the retention operation, the holding pin 33 moves in the direction indicated by the black arrow C relative to the CCD 101 disposed via the protective plate 19, and the target position of the centering of the CCD 101 moves in the direction indicated by the black arrow D so as to coincide with the center of the retention mechanism. This is because the target position of the centering and the center of the retention mechanism is displaced from each other due to manufacturing variations. According to the present embodiment, however, the centering of the CCD stage is not performed and the displacement therebetween is kept during the mechanical retention of the retention mechanism in order to avoid increase in the amount of currents needed for the centering. At the centering, a force to move the CCD stage, which changes as shown in FIG. 23, will occur in the direction indicated by the outline arrow E in FIG. 22, and a great amount of currents continuously flow according to the shifting of the CCD stage until the completion of the centering. As described above, it is possible to make a transition of the CCD stage from/to the electronically retained state to/from the mechanically retained state without causing the image shifts on the LCD monitor at the time of the release of the electronic or mechanical retention as well as to save power consumption.

In another example, a screen of the LCD monitor 1' is temporarily entirely covered with an OSD (On Screen Display) in black color at time tb when the release of the mechanical retention starts at time ta in FIG. 21 (or the centering stops). The temporary display of the OSD is stopped at a timing when a predetermined length of time has elapsed from the release of the mechanical retention or from the stop of the centering. Further, the temporary display of the On Screen Display is resumed after the stoppage at a timing when a predetermined length of time has elapsed from the release of the mechanical retention or from the stop of the centering. This allows the transition of the CCD stage from the electronically retained state to the mechanically retained state and from the mechanically retained state to the electronically retained state without changing the image transfer from the CCD 101 to the SDRAM 103 and from the SDRAM 103 to the LCD monitor 1' and without causing the image shifts on the LCD monitor at the time of the release of the electronic retention or the mechanical retention.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus comprising:
    an image sensor;
    a display section displaying an image from the image sensor;
    a shake detection section detecting a shake of the imaging apparatus;
    a blur correction section correcting a blur in an image due to the shake of the imaging apparatus;
    a driver section driving the blur correction section;
    a mechanical retention section mechanically retaining the blur correction section;
    an image blur correction function in which the blur correction section is mechanically retained at a predetermined position during non-performance of an image blur correction and the blur correction section is electronically retained in a drivable state at a predetermined position during the image blur correction; and
    a controller changing a display control over the display section when the blur correction section is transited from an electronically retained state to a mechanically retained state and/or from a mechanically retained state to an electronically retained state.

2. An imaging apparatus according to claim 1, wherein the display control over the display section is changed such that an image update operation thereto is temporarily stopped.

3. An imaging apparatus according to claim 2, wherein the image update operation to the display section is stopped at a timing when a predetermined length of time has elapsed from a stop of a control over the blur correction section in one of the electronically retained state and the mechanically retained state.

4. An imaging apparatus according to claim 2, wherein the image update operation to the display section is resumed after the stoppage at a timing when a predetermined length of time has elapsed from a stop of a control over the blur correction section in one of the electronically retained state and the mechanically retained state.

5. An imaging apparatus according to claim 1, wherein the display control over the display section is changed such that an On Screen Display (OSD) is temporarily displayed thereon.

6. An imaging apparatus according to claim 5, wherein the temporary display of the On Screen Display is stopped at a timing when a predetermined length of time has elapsed from a stop of a control over the blur correction section in one of the electronically retained state and the mechanically retained state.

7. An imaging apparatus according to claim 5, wherein the temporary display of the On Screen Display is resumed after the stoppage at a timing when a predetermined length of time has elapsed from a stop of a control over the blur correction section in one of the electronically retained state and the mechanically retained state.

8. An imaging method for an imaging apparatus comprising an image sensor, a display section displaying an image from the image sensor, a shake detection section detecting a shake of the imaging apparatus, a blur correction section correcting a blur in an image due to the shake of the imaging apparatus, a driver section driving the blur correction section, and a mechanical retention section mechanically retaining the blur correction section, the method comprising the steps of:
    in an image blur correction function, mechanically retaining the blur correction section at a predetermined position during non-performance of an image blur correction and electronically retaining the blur correction section in a drivable state at a predetermined position during the image blur correction; and changing a display control over the display section when the blur correction section is transited from an electronically retained state to a mechanically retained state and/or from a mechanically retained state to an electronically retained state.

9. An imaging method according to claim 8, further comprising the step of
changing the display control over the display section to temporarily stop an image update operation thereto when the blur correction section is transited from an electronically retained state to a mechanically retained state and/or from a mechanically retained state to an electronically retained state.

10. An imaging method according to claim 9, further comprising the step of
stopping the image update operation to the display section at a timing when a predetermined length of time has elapsed from a stop of a control over the blur correction section in one of the electronically retained state and the mechanically retained state.

11. An imaging method according to claim 9, further comprising the step of
resuming the image update operation to the display section after the stoppage at a timing when a predetermined length of time has elapsed from a stop of a control over the blur correction section in one of the electronically retained state and the mechanically retained state.

12. An imaging method according to claim 9, further comprising the step of
changing the display control over the display section to temporarily display an On Screen Display (OSD) thereon.

13. An imaging method according to claim 12, further comprising the step of
stopping the temporary display of the On Screen Display at a timing when a predetermined length of time has elapsed from a stop of a control over the blur correction section in one of the electronically retained state and the mechanically retained state.

14. An imaging method according to claim 12, further comprising the step of
resuming the temporary display of the On Screen Display after the stoppage at a timing when a predetermined length of time has elapsed from a stop of a control over the blur correction section in one of the electronically retained state and the mechanically retained state.

* * * * *